United States Patent
Sato et al.

(10) Patent No.: US 7,580,227 B2
(45) Date of Patent: Aug. 25, 2009

(54) MAGNETIC ELEMENT, MAGNETIC INFORMATION REPRODUCING HEAD, AND MAGNETIC INFORMATION REPRODUCING APPARATUS

(75) Inventors: Rie Sato, Kanagawa (JP); Koichi Mizushima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 10/875,273

(22) Filed: Jun. 25, 2004

(65) Prior Publication Data
US 2005/0024788 A1 Feb. 3, 2005

(30) Foreign Application Priority Data
Jun. 27, 2003 (JP) ............................. 2003-184486
Mar. 31, 2004 (JP) ............................. 2004-108059

(51) Int. Cl.
*G11B 5/39* (2006.01)
(52) U.S. Cl. ..................................... 360/313
(58) Field of Classification Search .................. 360/313
See application file for complete search history.

(56) References Cited

U.S. PATENT DOCUMENTS

| 5,534,355 | A * | 7/1996 | Okuno et al. ............ 428/811.3 |
| 6,657,823 | B2 * | 12/2003 | Kawato ...................... 360/314 |
| 6,700,760 | B1 * | 3/2004 | Mao ......................... 360/324.2 |
| 6,784,509 | B2 * | 8/2004 | Yuasa et al. ................. 257/421 |
| 6,828,785 | B2 * | 12/2004 | Hosomi et al. .............. 324/252 |
| 7,277,261 | B2 * | 10/2007 | Hayashi et al. ......... 360/324.12 |
| 2002/0135935 | A1 * | 9/2002 | Covington .................. 360/126 |
| 2003/0174446 | A1 * | 9/2003 | Hasegawa ................... 360/319 |

FOREIGN PATENT DOCUMENTS

| JP | 5-63249 | 3/1993 |
| JP | 9-270549 | 10/1997 |
| JP | 2002-26417 | 1/2002 |
| JP | 2002-92826 | 3/2002 |
| JP | 2002-289944 | 10/2002 |
| JP | 2003-6803 | 1/2003 |
| JP | 2003-77269 | 3/2003 |
| JP | 2003-130932 | 5/2003 |

OTHER PUBLICATIONS

U.S. Appl. No. 11/389,066, filed Mar. 27, 2006, Kudo et al.

* cited by examiner

*Primary Examiner*—Mark Blouin
(74) *Attorney, Agent, or Firm*—Oblon, Spivak, McClelland, Maier & Neustadt, P.C.

(57) ABSTRACT

A magnetic element has a first magnetic material exhibiting thermal fluctuation of magnetization which depends on an external magnetic field and generates spin fluctuation in conduction electrons; a nonmagnetic conductive material which is laminated on the first magnetic material and transfers the conduction electrons; a second magnetic material which is laminated on the nonmagnetic conductive material and generates a magnetic resonance upon injection of the conduction electrons; a first electrode electrically coupled with the first magnetic material; and a second electrode electrically coupled with the second magnetic material.

15 Claims, 11 Drawing Sheets

Ru (7, 8, 9, 10)   Co MAJORITY (11, 12)

UP-SPIN

Ru (7, 8, 9, 10)   Co MINORITY (7, 8, 9, 10)

DOWN-SPIN

MAGNETIC ELEMENT, MAGNETIC INFORMATION REPRODUCING HEAD, AND MAGNETIC INFORMATION REPRODUCING APPARATUS

CROSS-REFERENCE TO RELATED APPLICATIONS

This application is based upon and claims the benefit of priority from the prior Japanese Patent Applications No. 2003-184486, filed on Jun. 27, 2003 and No. 2004-108059 filed on Mar. 31, 2004, the entire contents of which are incorporated herein by reference.

BACKGROUND OF THE INVENTION

1. Field of the Invention

The present invention relates to a magnetic element, a magnetic information reproducing head for use in reproducing (reading) high-density magnetic information, and a magnetic information reproducing apparatus.

2. Description of the Related Art

Since the inception of a GMR head employing a giant magnetoresistance effect (GMR effect), recording density of magnetic recording has been increased at a rate of 100% per year. GMR elements include a spin-valve-type element, and an artificial-lattice-type element. The spin-valve-type element has a multilayer film including a ferromagnetic layer/nonmagnetic layer/ferromagnetic layer. The magnetization of one of the ferromagnetic layers is fixed by applying, e.g., an exchange bias magnetic field from an antiferromagnetic film, whereby the magnetization direction of the other ferromagnetic layer is reversed by an external magnetic field (signal magnetic field). Accordingly, a relative angle between magnetization directions of the two ferromagnetic layers changes, and this change can be detected as a change in the element resistance.

Spin-valve-type GMR elements include a CIP (Current In Plane)-type GMR element which detects change in resistance by applying electric current in plane to the multilayer film, and a CPP (Current Perpendicular to Plane)-type GMR element which detects change in resistance by applying electric current perpendicular to the multilayer film.

To cope with higher-density magnetic recording, TMR elements employing a tunnel magnetoresistance effect (TMR effect) have been developed. A TMR element has a multilayer film including a ferromagnetic layer/tunnel dielectric layer/ferromagnetic layer. When a voltage is applied between the two ferromagnetic layers, a tunnel current flows into the TMR element. A characteristic of a TMR element that the magnitude of a tunnel current flowing into the TMR element changes in accordance with the magnetization direction of the two ferromagnetic layers, can be utilized in detecting a change in the relative angle between the two ferromagnetic material layers as a change in tunnel resistance.

An MR ratio of a TMR element is approximately 50% maximum. Since a TMR element has an MR ratio larger than that of a GMR element, the signal voltage of a TMR element is larger than that of a GMR element. However, because of increased shot noise, a TMR element has not only larger pure signal components but also larger noise components than a GMR element, a TMR element has a problem that the SN ratio (signal-to-noise ratio) has not been improved.

Shot noise, which depends on current fluctuation caused by irregular passage of electrons through a tunnel barrier of a multilayer film, increases in proportion to the square root of the tunnel resistance. Therefore, to obtain a necessary signal voltage while suppressing shot noise, a tunnel dielectric layer must be made thinner so that the tunnel resistance is reduced.

As recording density becomes higher, the element size must be reduced so as to become substantially equal in size to a recording bit. To achieve this, a junction resistance of a tunnel dielectric layer must be diminished (i.e., the tunnel dielectric material layer must be made thinner). In order to attain a recording density of 300 Gbit/inch$^2$ (gigabits/square inch), a required junction resistance must be $1\Omega cm^2$ or smaller, which is equivalent to the thickness of a double-atomic layer of an Al—O (aluminum oxide film) tunnel dielectric layer. However, the thinner the tunnel dielectric layer, the more easily a short circuit can be created between the upper and lower ferromagnetic layers, which would result in a decrease in the MR ratio. Accordingly, fabrication of elements becomes exponentially more difficult.

In addition to the above, an element using spin-polarized current in a ferromagnetic material has been suggested. For example, in a spin injection three-terminal element, a transistor which performs gating by injecting spin-polarized current from a ferromagnetic material electrode into channels has been suggested (see JP-A-2002-26417).

Recently, a problem of magnetic white noise, which is common to above elements, has arisen. Unlike electrical noise such as shot noise, magnetic white noise is generated in response to thermal fluctuation of micro magnetic moment of a ferromagnetic material. As the downsizing of element proceeds, thermal fluctuation of elements is expected to become more dominant, exceeding the electrical noise in the range of 200 to 300 Gbit/inch$^2$. Avoiding magnetic white noise and further increasing the recording density of magnetic recording requires development of a micro-magnetic sensor whose operation principle differs from that of the conventional magnetoresistance effects.

SUMMARY OF THE INVENTION

As described above, magnetic white noise can pose a serious problem in high-density magnetic recording. The object of the invention is to provide a magnetic element or the like that is based on a new operation principle that makes good use of such magnetic white noise.

A magnetic element according to the present invention has: a first magnetic material (ferromagnetic material/antiferromagnetic material) exhibiting thermal fluctuation of magnetization which depends on an external magnetic field and generates spin fluctuation in conduction electrons; a nonmagnetic conductive material which is laminated on the first magnetic material and transfers the conduction electrons; a second magnetic material which is laminated on the nonmagnetic conduction material and generates magnetic resonance upon injection of the conduction electrons; a first electrode electrically coupled with the first magnetic material; and a second electrode electrically coupled with the second magnetic material. The first magnetic material can be selected from a ferromagnetic material and an antiferromagnetic material, and the second magnetic material can be selected from among a ferromagnetic material, a laminate including a plurality of ferromagnetic layers which are antiferromagnetically coupled with a nonmagnetic material disposed therebetween, and an antiferromagnetic material. The magnetic element is characterized by utilizing thermal fluctuation inevitably stemming from magnetization of a first minute magnetic material and by introducing into a second magnetic material spin fluctuation of conduction electrons derived from thermal fluctuation of magnetization of the first magnetic material by way of a nonmagnetic material. The spin fluctuation of the injected conduction electrons acts as an effective high-frequency magnetic field on the second electrode through an interaction such as "sd" exchange interaction, thereby inducing magnetic resonance in the second magnetic material.

When fluctuation of magnetization of a first magnetic material changes with an external magnetic field (signal magnetic field), the intensity of magnetic resonance induced on the second magnetic material changes. The changes in intensity of magnetic resonance are detected as changes in an effective electrical resistance of the magnetic element including the second magnetic material. By virtue of this principle, the magnetic element of the invention functions as a micromagnetic sensor of high sensitivity.

As described above, the magnetic element of the invention is characterized in that the magnetic element uses thermal fluctuation of magnetization of a first magnetic material, whereby the sensitivity and signal-to-noise ratio of the element do not decrease even when the junction area of the element is reduced. When the magnetic element is applied to a magnetic reproducing head for a magnetic information reproducing apparatus, it can be adapted to ultra-high-density recording in which recording density ranges from several hundred G (giga) bpsi to 1 T (tera) bpsi or higher.

As described above, the magnetic element of the present invention has a characteristic that the sensitivity and signal-to-noise ratio thereof are not reduced even when the junction area of the element is reduced, thereby realizing high recording density and enhanced magnetoresistance change.

DETAILED DESCRIPTION OF THE PREFERRED EMBODIMENTS

Figure 1:
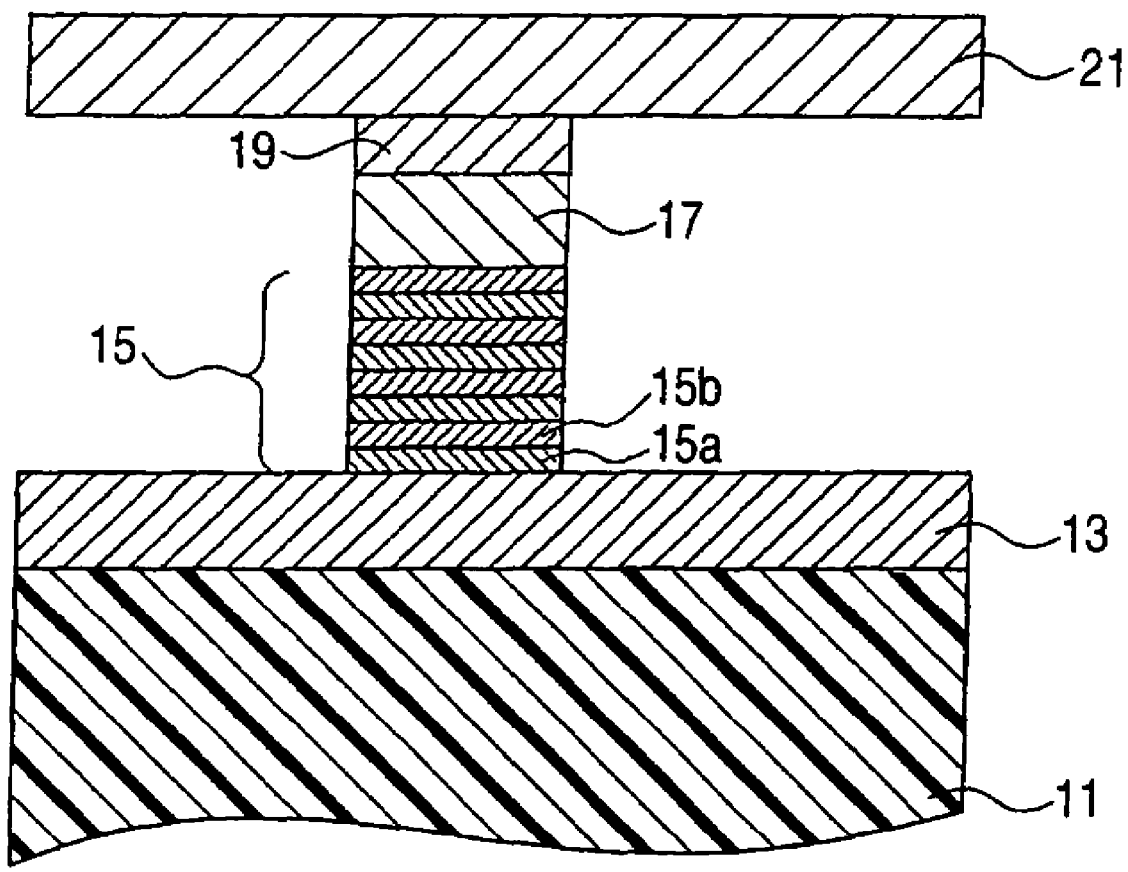
FIG. 1 is a sectional schematic diagram showing a magnetic element according to a first embodiment of the invention.

Hereinafter, embodiments of the invention will be described by reference to the drawings. In the following descriptions, the same elements are assigned the same reference numerals, and repeated descriptions thereof are omitted. Respective drawings are schematic representations, which may represent shapes, sizes, and ratios that differ from those of the actual apparatus. However, the shapes, sizes, and ratios can be changed during actual manufacture of elements in consideration of the following descriptions and the known art.

First Embodiment

FIG. 1 is a sectional view for explaining a magnetic element according to a first embodiment of the invention.

The magnetic element is deposited on a substrate 11 in FIG. 1, and has a lower electrode 13 which also serves as a magnetic shield, an artificial lattice film (also called an "artificial antiferromagnetic film") 15 which is deposited thereon, a nonmagnetic film 17, a ferromagnetic film 19, and an upper electrode 21 which also serves as a magnetic shield. The lower electrode 13 and the upper electrode 21, which also serve as wiring, extend laterally in the plane of FIG. 1, and are connected at their end portions to a current supply circuit which controls a current flow to the element, a reading (sense) circuit, or the like.

In the above embodiment, the lower electrode 13 and the upper electrode 21 serve as both a magnetic shield and wiring. However, a magnetic shield and wiring may be provided separately. Even in such a case, a magnetic shield and wiring can be formed in plane with the face of the electrodes 13 and 21 or the ferromagnetic film 19 (i.e., in the sectional view of FIG. 1, in plane with the figure extending laterally).

The element described above actively utilizes thermal fluctuation, which inevitably arises in a micro-ferromagnetic material. Specifically, the element is characterized in that the artificial antiferromagnetic film 15 located adjacent to the ferromagnetic film 19 with the nonmagnetic film 17 therebetween is provided with conduction electrons exhibiting spin fluctuation stemming from thermal fluctuation of magnetization of the ferromagnetic film 19. The spin fluctuation of the injected conduction electrons acts as an effective high-frequency magnetic field through "sd" exchange interaction in the artificial antiferromagnetic film 15, thereby inducing magnetic resonance in the artificial antiferromagnetic film 15.

When fluctuation of magnetization of the ferromagnetic film 19 changes along with a change in an external magnetic field, the intensity of magnetic resonance induced by the artificial antiferromagnetic film 15 changes. The changes in intensity of magnetic resonance are detected as changes in an effective electrical resistance of the magnetic element. The above principle allows attainment of element resistance changes within the range of tens to several hundred percent with respect to a change of approximately 10 Oe (oersted) in the external magnetic field. As described above, the element of the embodiment functions as a micro-magnetic sensor of high sensitivity.

The magnetic element of the embodiment is characterized by employing thermal fluctuation of magnetization of the ferromagnetic film 19, and accordingly the sensitivity and the signal-to-noise ratio of the element do not decrease even when the junction area of the element (junction area between the artificial antiferromagnetic film 15 and the nonmagnetic film 17, or that between the nonmagnetic film 17 and the ferromagnetic film 19) is reduced. Accordingly, when the magnetic element is applied to a magnetic reproducing head for use in a magnetic information reproducing apparatus, it can be adapted to ultra-high-density recording in which recording density ranges from several hundred Gbpsi to 1 Tbpsi or higher.

In the embodiment, a reading magnetic head which is adaptable to 1 Tb/inch$^2$ is adopted as an example of a micro-ferromagnetic material. Specifically, the ferromagnetic film 19 of the embodiment is assumed to have an area of approximately 30×30 nm$^2$ and a thickness of approximately 1 nm. The areas of the artificial antiferromagnetic film 15 and the nonmagnetic film 17 can also be set to that of the ferromagnetic film 19. That is, the junction area of the element is set to approximately 30×30 nm$^2$. In this embodiment, the artificial antiferromagnetic film 15, the nonmagnetic film 17, and the ferromagnetic film 19 are deposited in the shape of a square prism, wherein the four side faces of the square prism are surrounded by nonmagnetic material (not shown). The multilayer film can be changed to other shapes, such as a circular cylinder, a triangular prism, or a polygonal prism, as required.

$A_xMn_{1-x}$ (wherein A is at least one selected from the group including Fe, Co, NI, Ir, Pr, Rh, Cu, Cr, Pt, Pd, Al and Ti, and x is defined as $0 \leq x \leq 1$) or $B_yC_{1-y}$ (wherein B is at least one of Fe and Ni, and C selected from the group including V, Cr, and CU; and y is defined as $0 \leq y \leq 1$). These materials can be used as a magnetic material 15 when a magnetic material film is used instead of the artificial antiferromagnetic 15.

The ferromagnetic film 19, the nonmagnetic film 17, and the artificial antiferromagnetic film 15 can have a crystal structure of a (0001) alignment layer of the hexagonal close-packed structure, or a (111) alignment layer of the face-centered cubic structure.

A noble metal, such as Al, Pt, Au, Ag, or Cu, or nonmagnetic transition metal, such as Cr, Ru, or Pd, can be used for the nonmagnetic film.

The thickness of the nonmagnetic film 17 can be set in the range of approximately 1 nm to several tens of nm; e.g., approximately 5 nm. The nonmagnetic film 17 interrupts the exchange interaction which occurs between the ferromagnetic film 19 and the artificial antiferromagnetic film 15, while simultaneously transferring by current the spin fluctuation of the conduction electrons generated in the ferromagnetic film 19 to the artificial antiferromagnetic film 15 (FIG. 1).

The artificial antiferromagnetic film 15 is an artificial lattice film where ferromagnetic layers 15a and nonmagnetic layers 15b are alternately laminated. The two ferromagnetic layers 15a that sandwich a given nonmagnetic layer 15b are coupled so that their magnetization directions are substantially antiparallel. In other words, the two ferromagnetic layers 15a are coupled antiferromagnetically.

Fe, Co, Ni, or an alloy thereof can be used for the ferromagnetic layer 15a of the artificial antiferromagnetic film 15. A noble metal, such as Pt, Au, Ag, or Cu, or a nonmagnetic transition metal, such as Cr, Ru, Rh, Mo, or W, can be used for the nonmagnetic layer 15b.

For a reason to be described later, the thickness of the ferromagnetic layer 15a preferably falls within the range of approximately 0.1 nm to approximately 1 nm; e.g., approximately 0.5 nm. Since the nonmagnetic layer 15b controls the intensity of antiferromagnetic coupling between the two neighboring ferromagnetic layers 15a, the thickness of the nonmagnetic material layer 15b can be set to, e.g., the range of approximately 0.2 nm to 2 nm. The overall thickness of the artificial antiferromagnetic film 15 is set to several tens of nm; e.g., approximately 30 nm. The coupling intensity of the two neighboring ferromagnetic layers 15a is set to, e.g., 0.5 to 10 erg/cm$^2$ by adjusting the thicknesses and materials of the ferromagnetic layer 15a and/or the nonmagnetic layer 15b.

For the electrodes 13 and 21, a film including a metal such as Al, Cu, Au, or Ag is used. When the electrodes 13 and 21 also serve as magnetic shields, they are formed by laminating the above metal film and a film of a known shield material such as NiFe.

For the substrate 11, there is used a substrate material which is generally suitable for deposition of a magnetic element; e.g., a substrate of nonmagnetic insulating material such as silicon, $Al_2O_3$, TiC, or $SiO_2$.

Thermal fluctuation of magnetization of the ferromagnetic film 19 will be described below.

Figure 2A:
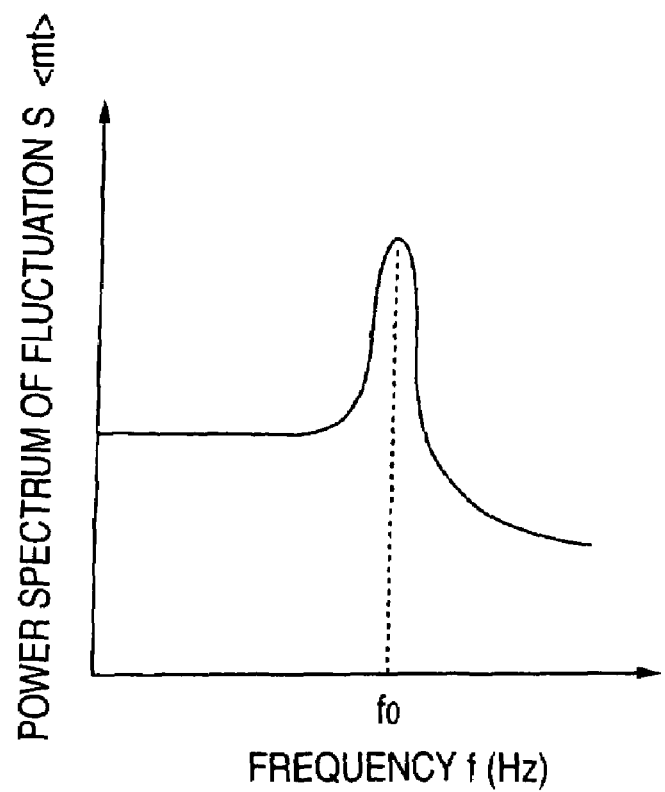
FIGS. 2A and 2B are a graph for explaining thermal fluctuation of magnetization of a ferromagnetic material and power spectrum.
Figure 2B:
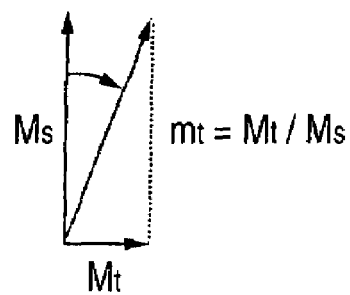

FIG. 2A shows a schematic power spectrum $S_{<mt>}$ of thermal fluctuation of the ferromagnetic film 19. FIG. 2B shows magnetization components in plane with the ferromagnetic film 19, where $M_s$ is a saturation magnetization of the ferromagnetic film 19, and $M_t$ is a transverse component which is perpendicular to the saturation magnetization of a ferromagnetic film 19. That is, $m_t$ in FIG. 2B shows an angle (radian) of thermal fluctuation of magnetization of the ferromagnetic film 19.

Thermal fluctuation of magnetization of the ferromagnetic film 19 at a temperature "T" (Kelvin) can be represented by the following equation (1) using a power spectrum $S_{<mt>}$ of the mean square $<m_t^2>$ of $m_t$ (i.e., $M_t/M_s$).

$$\begin{aligned}\langle m_t^2 \rangle &= \int S_{\langle mt \rangle} df \\ S_{\langle mt \rangle} &= \frac{2kT}{\pi f} \frac{\chi''_{FM}}{M_S^2 V_{FM}} \\ \chi''_{FM} &= \frac{\gamma^2 M(\alpha/\gamma) 2\pi f}{(2\pi f_0 - 2\pi f)^2 + \gamma^2 (\alpha/\gamma)^2 (2\pi f)^2} \\ 2\pi f_0 &= \gamma \sqrt{4\pi M_s (H + H_k)} \end{aligned} \quad (1)$$

In the equation (1), $\chi''_{FM}$ is the imaginary component of high-frequency susceptibility of the ferromagnetic film 19, $V_{FM}$ is volume of the ferromagnetic film 19, α is Gilbert damping constant, γ (i.e., 19×10$^6$ rad/s Oe) is gyromagnetic ratio, $f_0$ is resonance frequency of the ferromagnetic film 19, H is the external magnetic field of the ferromagnetic film 19, and $H_K$ is the anisotropic magnetic field of the ferromagnetic film 19.

The equation (1) and FIG. 2A show that high-frequency susceptibility $\chi''_{FM}$ increases in the vicinity where the external magnetic field frequency "f" is close to the resonance frequency f. They also show that the power spectrum $S_{<mt>}$ of magnetization of the ferromagnetic film 19 increases as well.

In the case where Fe (saturation magnetization $M_S$=1,700 Gauss) having a volume $V_{FM}$ of about 30×30×1 nm$^3$ is used as the ferromagnetic film 19, resonance frequency $f_0$ is 10 GHz, and Gilbert damping constant α is 0.01, the thermal fluctuation of magnetization of the ferromagnetic film 19 $<m_t^2>^{1/2}$ can be represented as shown by the following equation (2), where the external magnetization field frequency "f" is equal to $f_0$, and the band width is Δf.

$$\sqrt{\langle m_t^2 \rangle} = \sqrt{S_{\langle mt \rangle}(f_0) f \Delta} = 0.1 \text{radian} = 6° \quad (2)$$

where the band width Δf is set at the half bandwidth of the resonance line of the ferromagnetic film 19, as follows: $\Delta f = 2\alpha f_0 = 2 \times 10^8$ Hz.

Conduction electrons in the ferromagnetic film 19 having the magnetization fluctuation described above will have spin fluctuation which depends on the thermal fluctuation of magnetization of the ferromagnetic film 19. The conduction electrons, which have the spin fluctuation, are transferred by current flowing into the multilayer film, and are then injected into the artificial antiferromagnetic film 15 after having passing through the nonmagnetic film 17. The spin fluctuation of the injected conduction electrons acts as an effective high-frequency magnetic field through "sd" exchange interaction on the artificial antiferromagnetic film 15, thereby inducing magnetic resonance in the artificial antiferromagnetic film 15.

The intensity of the effective high-frequency magnetic field depends on the magnitude of fluctuation $S_{\langle mt \rangle}$ and the following: spin polarization degree P of conduction electrons in the ferromagnetic film 19; spin-transfer efficiency of the nonmagnetic film 17; intensity of "sd" exchange interaction $J_{sd}$ in the artificial antiferromagnetic film 15; current density "i"; junction area "S" (i.e., a junction area of the artificial antiferromagnetic film 15 and the nonmagnetic film 17, and having the same size as the element in the embodiment); volume of the artificial antiferromagnetic film 15 $V_{AF}$; and relaxation time $\tau_s$ of the spin introduced into the artificial antiferromagnetic film 15.

When the spin-transfer efficiency of the nonmagnetic film 17 is set at about 100% and the thickness of the artificial antiferromagnetic film 15 is set approximately equal to the attenuation length $\lambda_{AF}$ of the spin transverse component, the effective magnetic field $H_{eff}$ can be represented by the following equation (3).

$$H_{eff}^2 \cong S_{\langle mt \rangle} \left[ \frac{1}{N} \left( \frac{iS\tau_s}{V_{AF}} \right) \left( \frac{2J_{sd}}{g\mu_B} \right) \left( \frac{P}{2} \right) \right]^2 \Delta f \quad (3)$$

Here, "N" is the magnetic ion density in the ferromagnetic layer 15a that forms the artificial antiferromagnetic film 15, "g" is a "g factor" (approximately 2), and $\mu_B$ is the Bohr magneton. Induction of magnetic resonance in the artificial antiferromagnetic film 15 requires an effective high-frequency magnetic field (i.e., spin fluctuation of conduction electrons) which is perpendicular (transverse direction) to the magnetization. Accordingly, the spin relaxation time in the equation (3) represents the relaxation time $\tau_s$ (sec) of the transverse component.

Recent studies have shown that when conduction electrons are injected into a ferromagnetic material through a nonmagnetic material, spins thereof receive torque caused by magnetization of the ferromagnetic material, and the transverse components (components perpendicular to magnetization) of the spins are attenuated rapidly in the vicinity of the interface. When up spins and down spins in the ferromagnetic material are assumed to have Fermi wave numbers $k_{F\uparrow}$ and $k_{F\downarrow}$, respectively, the attenuation length $\lambda_{FM}$ of the transverse components is approximately $2\pi/|k_{F\uparrow} - k_{F\downarrow}|$. For example, attenuation length $\lambda_{FM}$ of Fe is approximately 3 nm.

Meanwhile, for an antiferromagnetic material such as Mn, a relation $k_{F\uparrow} = k_{F\downarrow}$ stands, wherein torque is not applied, and the attenuation length $\lambda_{FM}$ is several tens of nanometers or longer.

Also in the case of the artificial antiferromagnetic film 15 of the embodiment, when the thicknesses of the ferromagnetic layers 15a which form the artificial antiferromagnetic film 15 are sufficiently thin in relation to the attenuation length $\lambda_{FM}$ (approximately 3 nm), the attenuation length $\lambda_{AF}$ becomes several tens of nanometers or longer as in the case with a general antiferromagnetic material. The reason for the above is that the electrons injected into the artificial antiferromagnetic film 15 can pass through the first ferromagnetic layer 15a without being attenuated significantly by the spin transverse components, and in the next ferromagnetic layer 15a, where the magnetization direction is opposite, the spin transverse components are recovered by application of torque of the opposite direction.

The relaxation time $\tau_s$ of transverse components of electron spins in the artificial antiferromagnetic film 15 can be estimated from the relationship shown by the following equation (4).

$$\left. \begin{array}{l} \lambda_{AF} = \sqrt{D\tau_S} \\ D = \frac{1}{3}\gamma_F l \end{array} \right\} \quad (4)$$

Here, "D" is a diffusion coefficient (approximately 10 cm$^2$/s), $V_F$ is the Fermi velocity of electrons, and "l" is a mean free path of electrons. When the parameters are set such that $\lambda_{AF}$ is approximately 30 nm, "l" is approximately 2 nm, and $V_F$ is approximately $10^8$ cm/s, $\tau_s$ can be estimated as approximately $3 \times 10^{-12}$ sec.

Of the remaining parameters in the equation (3), $J_{sd}$ is approximately 0.5 eV, N is approximately $8 \times 10^{22}$/cm$^3$, and P is approximately 0.4. In the case where a junction area "S" is $30 \times 30$ nm$^2$ and the volume $V_{AF}$ of the artificial antiferromagnetic film 15 is $30 \times 30 \times 10$ nm$^3$, the effective magnetic field $H_{eff}$, where $f_0$ is 10 GHz, is approximately $(4 \times 10^{-4})$ i (Oe), wherein $\Delta f = 2\alpha f_0$ is assumed to be approximately $2 \times 10^8$ Hz in the equation (3).

The above result shows that an intense high-frequency magnetic field of several tens of Oe is generated where the current density "i" is approximately $10^5$ A/cm$^2$. Of the remaining parameters, $S_{\langle mt \rangle}$ is $5 \times 10^{-22}$ Hz$^{-1}$, and $\mu_B$ is $9.27 \times 10^{-21}$ erg/gauss.

In general, when a high-frequency magnetic field $H_{rf}$ having frequency "f" is applied to an antiferromagnetic material of volume $V_{AF}$, energy P absorbed by magnetic resonance per unit time can be represented by the following equation (5). $\chi''_{AF}$ in the equation (5) is the imaginary component of high-frequency susceptibility of the antiferromagnetic material.

$$P = \frac{1}{2}\chi''_{AF} H_{rf}^2 (2\pi f) V_{AF} \quad (5)$$

In the artificial antiferromagnetic film 15, not a single frequency but a distributed frequency exists in the magnetic field. Accordingly, the absorption energy per unit of time can be represented by the following equation (6), which was obtained by substituting for some terms of the equation (5).

$$P \cong \frac{1}{2} \int df \chi''_{SAF} S_{\langle mt \rangle} \left[ \frac{1}{N} \left( \frac{iS\tau_S}{V_{AF}} \right) \frac{2J_{sd}}{g\mu_B} \left( \frac{P}{2} \right) \right]^2 (2\pi f) V_{AF} \quad (6)$$

Here, $\chi''_{SAF}$ is an imaginary component of complex susceptibility of the artificial antiferromagnetic film 15 represented by the following equation (7).

$$\chi''_{SAF} \cong \sqrt{\frac{H_A}{2H_E}} \left\{ \frac{\gamma^2 M_{sub}\left(\frac{\alpha'}{\gamma}\right)(2\pi f)}{(2\pi f_1 - 2\pi f)^2 + \gamma^2\left(\frac{\alpha'}{\gamma}\right)^2(2\pi f)^2} \right\} \quad (7)$$

$$2\pi f_1 = \gamma\sqrt{2H_E H_A}$$

In the equation (7), $H_A$ is an anisotropic magnetic field, $H_E$ is an exchange magnetic field acting between the ferromagnetic layers 15a, $M_{sub}$ is sub-lattice magnetization of the artificial antiferromagnetic film 15, $f_1$ is the resonance frequency of the artificial antiferromagnetic film 15, and $\alpha'$ is Gilbert damping constant of the ferromagnetic layer 15a.

When the same material as that used for the ferromagnetic film 19, such as Fe, is assumed to be used for the ferromagnetic layers 15a, and terms of the equation (7) are as follows: $f_1=f_0=10$ GHz; $\alpha'=\alpha=0.01$; $H_A$ is approximately $4\times10^2$ Oe; $H_E$ is approximately $1.5\times10^4$ Oe; and $M_{sub}$ is substantially equal to $(M_s/2) L_{Fe}/(L_{Fe}+L_N)$, the following equation (8) is obtained from the equations (6) and (7). In the equation (8), $L_{Fe}$ and $L_N$ are the thicknesses of the ferromagnetic layer 15a and nonmagnetic layer 15b of the artificial antiferromagnetic film 15, respectively, and I (i.e., iS) is the current that flows through the element.

$$P \cong (2.1 \chi 10^2)\left(\frac{L_{Fe}}{L_{Fe}+L_N}\right)I^2 \text{ watt} \quad (8)$$

From the equation (8), it can be understood that the resonance absorption increases the element resistance only by the effective resistance $R_{eff}$ given by the following equation (9).

$$R_{eff} \cong 2.1 \chi 10^2 \left(\frac{L_{Fe}}{L_{Fe}+L_N}\right) \quad (9)$$

Under the assumption of $L_{Fe}/(L_{Fe}+L_N)=2/3$, $R_{eff}$ is estimated to be $140\Omega$. The element resistance "R" achieved in a state of no resonance absorption corresponds to the sum of interface resistance $R_c$ and bulk resistance $R_b$. When an interface resistance between a magnetic material and a nonmagnetic material is set to $2\times10^{-11}$ $\Omega cm^2$ and the number of the interfaces is set to 20, the element resistance $R_c$ of an element having an area of $30\times30$ nm$^2$ is approximately $44\Omega$, and the bulk resistance $R_b$ under a resistivity of $10^{-5}$ cm is approximately $1\Omega$. Accordingly, $(\Delta R/R)=R_{eff}/(R_c+R_b)$ of approximately 3.1 is obtained, and this indicates that inducing magnetic resonance changes the resistance of a magnetic element by approximately 200%.

Under the flow of a current $I=10$ µA ($I=1.1\times10^6$ A/cm$^2$), the change in the resistance $\Delta V$ is approximately 1.4 mV. From the equation (1), the half width ($\Delta H/2$) of the resonance line of the ferromagnetic film 19 is obtained as shown by the following equation (10), where it is converted into a magnetic field to yield a result of approximately 30 Oe.

$$\frac{\Delta H}{2} = \frac{\alpha(2\pi f)}{\gamma} \quad (10)$$

Figure 3:
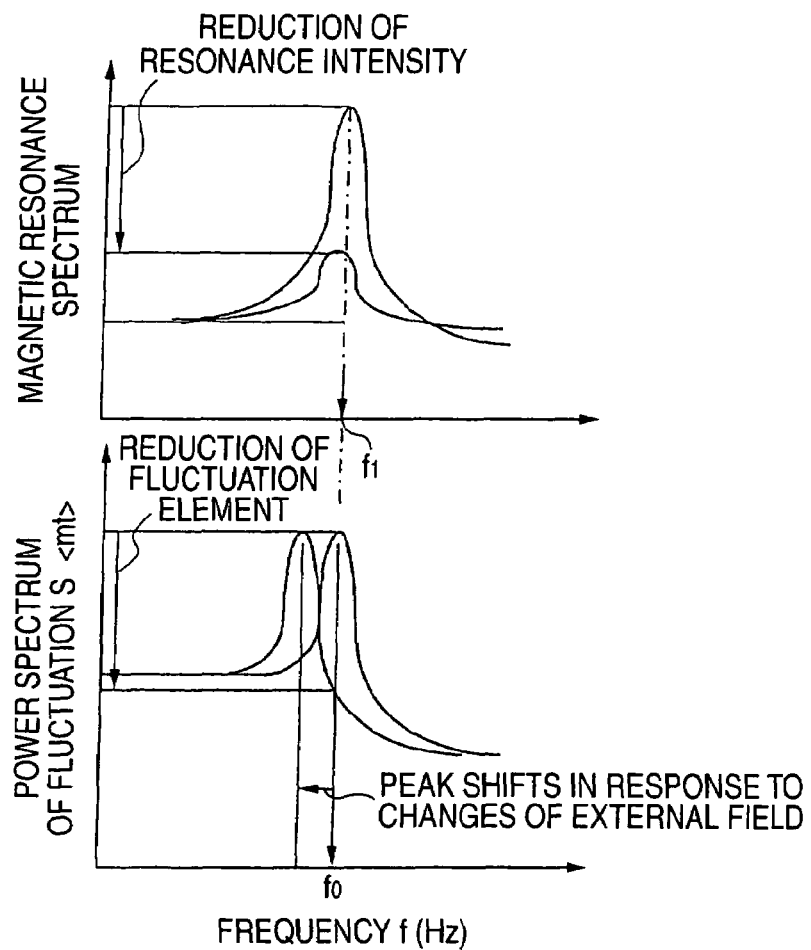
FIG. 3 is a graph showing that a magnetic resonance spectrum of an artificial antiferromagnetic material depends on an external magnetic field.

The above description will be explained by reference to FIG. 3 below. FIG. 3 indicates that when the external magnetic field is changed by approximately 30 Oe the power spectrum of magnetization fluctuation $S_{<m_t>}$ where frequency $f_0=f_1=10$ GHz decreases significantly. It also shows that the spectrum changes from a state of intense resonance absorption to a state of little resonance absorption at the frequency $f_1$ of the artificial antiferromagnetic substance 15. Consequently, the intensity of the magnetic resonance of the artificial antiferromagnetic substance 15 diminishes.

Here, it is important to set the in plane magnetization direction (direction of magnetization easy axis) substantially perpendicular to the external magnetic field so that the resonance frequency of the artificial antiferromagnetic film 15 will not change in response to changes in the external magnetic field.

In the above description, for the sake of brevity the magnetic resonance frequency $f_1$ of the artificial antiferromagnetic film 15 was assumed to be equal to the resonance frequency of the ferromagnetic film. However, optimizing the variance between $f_1$ and $f_0$ enables fabrication of a magnetic sensor of high sensitivity whose resistance changes by several tens of percent in response to a change in the external magnetic field of a few Oe and which can obtain a signal voltage of approximately 1 mV.

The magnetic resonance frequency $f_1$ of the artificial antiferromagnetic film 15 and the resonance frequency $f_0$ of the ferromagnetic film 19 can be adjusted, for example, as follows. First, the thicknesses of the magnetic layer 15a and the nonmagnetic layer 15b in the artificial antiferromagnetic film 15 are adjusted such that $f_1$ becomes approximately 10 GHz. Then, the bias magnetic field which is applied in the direction of magnetization easy axis of the ferromagnetic film 19 is adjusted so that $f_0$ becomes equal to $f_1$.

Electrical and magnetic noise of a magnetic sensor according to the embodiment will be described below. A magnetic sensor shown in FIG. 1 includes a number of interfaces between ferromagnetic materials and nonmagnetic materials. However, since the total electric voltage $V_0$ applied to the element is only a few mV, the following relationship stands: $eV_0 \ll kT$, thermal, whereby noise derived from the following equation (11) becomes dominant as electric noise.

$$\sqrt{<\Delta V_{thermal}^2>} = \sqrt{4kTR\Delta f_B} \quad (11)$$

As described above, when the element resistance R is set to $(44+1)$ $\Omega$; and $\Delta f_B$ is set to 300 MHz, the resistance of the electrical noise can be represented by the following equation (12)

$$\sqrt{<\Delta V_{thermal}^2>} = 15 \, \mu V \quad (12)$$

The mean time of fluctuation $<m_t^2>$ used in the equation (1) originally indicates an average fluctuation time during a sufficiently long time. In an actual element, however, a mean time is taken during approximately $(1/300\times10^6)$ seconds; that is, $T_B$; i.e., $1/f_B$, which corresponds to the operation frequency. Therefore, when a magnetization fluctuates for a longer time (i.e., with a lower frequency) than that described above, its fluctuation serves as fluctuation of resonance absorption power or fluctuation of effective resistance, thereby generating element noise. Power fluctuation $\Delta P$ at frequency $f_B$ or lower can be represented by the following equation (13), which is similar to the equation (5).

$$\Delta P \cong \frac{1}{2}\int_0^{f_B} df \chi''_{SAF} S_{\langle mt \rangle} \left[\frac{1}{N}\left(\frac{iS\tau_S}{V_{AF}}\right)\frac{2J_{sd}}{g\mu_B}\left(\frac{P}{2}\right)\right]^2 (2\pi f) V_{AF} \quad (13)$$

The integral range of the equation (13) is smaller by one order of magnitude or more than the peak frequencies at which $f_1$ is $\chi''_{SAF}$ and at which $f_0$ is $S_{\langle mt \rangle}$, which are shown in FIGS. 2 and 3. Accordingly, the integral values are so small that $\Delta P$ is smaller than $10^{-6}$ P. Since the output voltage noise generated by the fluctuation of the effective resistance is proportional to $\Delta P$, the magnetic voltage noise is also quite small, as shown by the following equation (14).

$$\sqrt{\langle \Delta V_{mag}^2 \rangle} \langle 10^{-6} V_{sig} \quad (14)$$

In the equation (14), $V_{mag}$ is a voltage of a magnetic noise caused as described above, and $V_{sig}$ is a signal voltage.

Specifically, the intrinsic magnetic noise of this element is quite small, and the dominant cause of magnetic noise is the external magnetic field or fluctuation of the anisotropic magnetic field. The square of signal-to-noise ratio (SNR) of an element, in which the intrinsic electric noise and magnetic noise are added, can be represented by the following equation (15).

$$\frac{\langle \Delta V \rangle}{V_{sig}^2} = \frac{\langle \Delta V_{thermal}^2 \rangle + \langle V_{mag}^2 \rangle}{V_{sig}^2} \cong \frac{\langle \Delta V_{thermal}^2 \rangle}{V_{sig}^2} \quad (15)$$

A signal-to-noise ratio achieved at $V_{sig}=1$ mV becomes as represented by the following equation (16). From this, it is understood that the element can exhibit an intrinsically high signal-to-noise ratio.

$$SNR = \left(\frac{\langle \Delta V^2 \rangle}{V_{sig}^2}\right)^{1/2} \cong 67 \cong 36 dB \quad (16)$$

The equation (2) holds when the thickness of the artificial antiferromagnetic film 15 is approximately equal to the attenuation length $\lambda_{AF}$ of a transverse component of a spin. The effective magnetic field in the artificial antiferromagnetic substance 15 is proportional to the introduced spin density. Therefore, the sensitivity of the element can be increased when the thickness of the artificial antiferromagnetic film 15 is reduced, thereby confining the injected electrons within the artificial antiferromagnetic film 15 by means of providing an appropriate barrier. The barrier may be inserted in a layer structure, as shown by, for example, reference numeral 29 in a sectional view of an element in FIG. 4.

Figure 4:
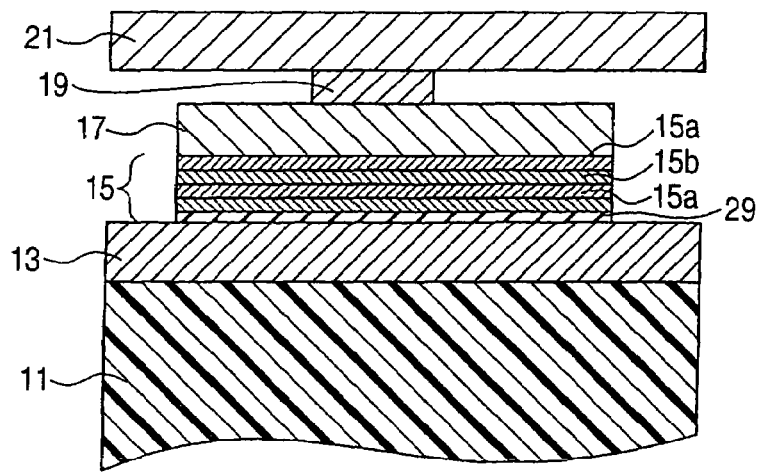
FIG. 4 is a sectional schematic diagram showing an element into which a barrier layer is inserted so that conduction electrons can be confined within an artificial antiferromagnetic film.

The barrier layer 29 of FIG. 4 is deposited between the lower electrode 13 and the artificial antiferromagnetic film 15. Alternatively, the barrier layer may be inserted between the artificial antiferromagnetic film 15 and the nonmagnetic film 17, or may be deposited on both upper and lower sides of the artificial antiferromagnetic film 15. Further, The barrier layer may be deposited between the ferromagnetic layer 19 and the nonmagnetic material layer 17.

For example, in the case where the thickness of the artificial antiferromagnetic film 15 is reduced from 10 nm to 3 nm, and barriers having an electron transmittance of one-tenth are provided on both sides of the artificial antiferromagnetic film 15, the element resistance in a state where no resonance exists is approximately 90Ω. However, since the effective resistance $R_{eff}$ caused by resonance absorption increases to approximately 330Ω, the rate of change in resistance rises to approximately 400%. Materials that can be used for the barrier include CuO, $Al_2O_3$, MgO, and other oxides, AlN and other nitrides, and Si, Ge, ZnS, and other semiconductors. The average thickness of the laminated barrier as measured at 10 points is set to approximately 1 nm or less, preferably within the range of approximately 0.1 to 0.5 nm (micropores such as pinholes are allowable).

Furthermore, as can be seen from the sectional view of an element in FIG. 4, even in a case where the artificial antiferromagnetic film 15 is maintained at a fixed volume, the interface resistance and the bulk resistance are reduced by means of increasing a flat area of the nonmagnetic film 17 and flat areas of the respective ferromagnetic layers 15a, 15b of the artificial antiferromagnetic substance 15. Hence, the rate of change in resistance and signal-to-noise ratio can be increased.

It is also possible to further increase the resonance characteristics or variance of absorption powers (i.e., the rate of change in resistance) in a state where no resonance exists, as follows. When the coupling between two ferromagnetic layers 15a in the artificial antiferromagnetic film 15 is weakened, a cluster of a plurality of ferromagnetic materials is substantially formed, whereby $\chi''_{AF}$ is increased by as much as several fold. In order to weaken the inter-layer coupling between the ferromagnetic layers 15a (i.e., 0.1 erg/$cm^2$), the thickness of the noble metal nonmagnetic material is to be set to, e.g., approximately 5 nm or more.

Furthermore, an element can also be formed from a ferromagnetic film whose $\lambda_{FM}$ is approximately 3 nm, instead of from the artificial antiferromagnetic film 15. In spite of the characteristics of the element being inferior to those of the artificial antiferromagnetic film 15, however, the element exhibits satisfactory functions as a sensor. Specific examples of such magnetic elements include a single element of Fe, Co, or Ni, or an alloy including any of these elements.

Instead of a ferromagnetic material, an antiferromagnetic material may be used as the magnetic material exhibiting thermal fluctuation which depends on an external magnetic field and generates conduction electrons having spin fluctuation which depends on the thermal fluctuation. Moreover, instead of an antiferromagnetically coupled laminate, an antiferromagnetic material may be used as the magnetic material which generates magnetic resonance upon injection of conduction electrons having spin fluctuation, the intensity thereof changing in response to changes in the thermal fluctuation of magnetization. Note here that both the thermal fluctuation of magnetization and high-frequency susceptibility of the antiferromagnetic material decrease in a frequency band of the tera Hz order. This means that, when an element including the antiferromagnetic material is used, the resonance intensity of the antiferromagnetic material becomes about 1/100 that of an element using the artificial antiferromagnetic film described hitherto, and that the output voltage becomes about 1/10.

Second Embodiment

The previous embodiment has examined a spin dependence of interface reflection in relation to an injection efficiency of transverse component of spins under injection from a nonmagnetic film 17 into a magnetic film (e.g., an artificial antimagnetic film 15).

Figure 5:
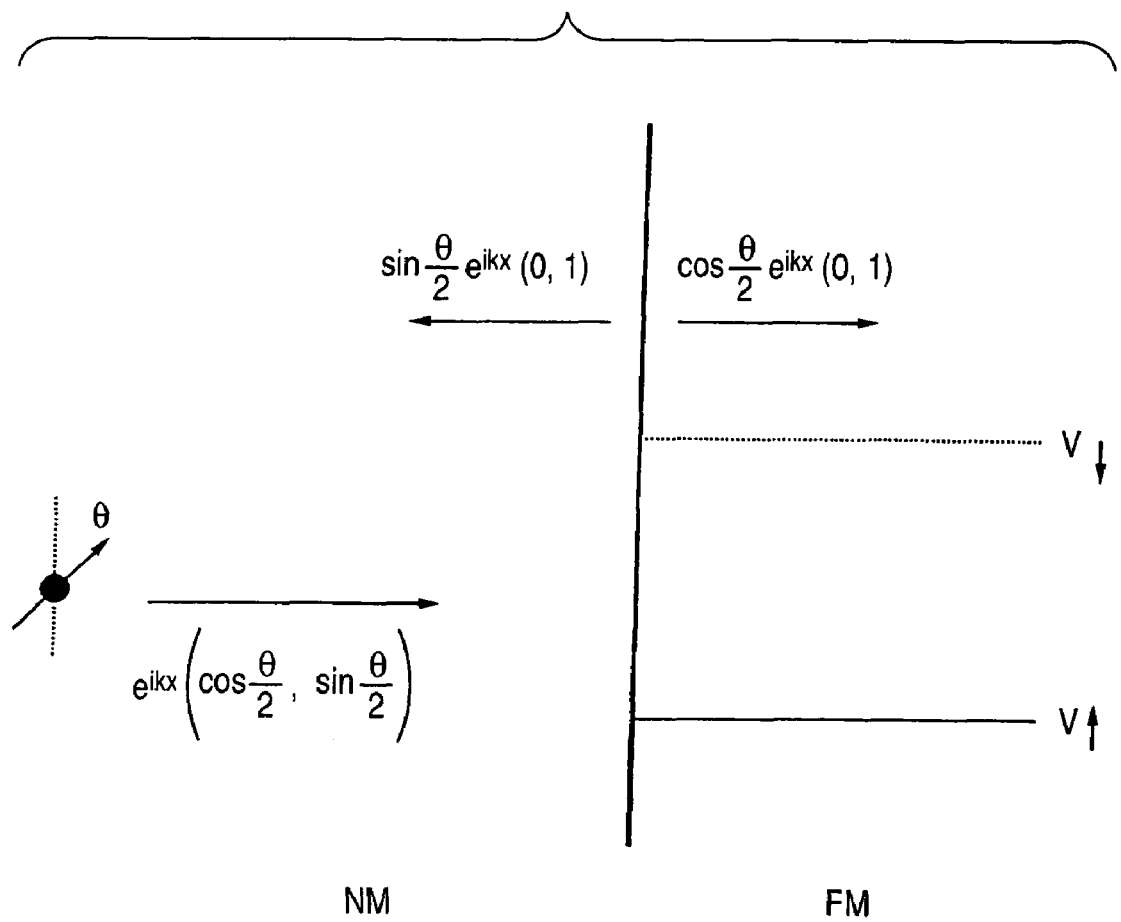
FIG. 5 is a schematic diagram showing a band structure of an up-spin and down-spin in a magnetic material.

As shown in FIG. 5, up-spins and down-spins have different band structures in the magnetic material 15. For this reason, the potential barrier of the interface depends on spins (a potential barrier of an up-spin is indicated by $V_\uparrow$, and that of a down-spin is indicated by $V_\downarrow$).

Now, the direction of a quantization axis (i.e., the direction of the internal magnetic field of the second magnetic material) and a spin function sloped at an angle θ can be represented as the following equation (17).

$$\psi = e^{ikx}\left(\cos\frac{\theta}{2}, \sin\frac{\theta}{2}\right) \quad (17)$$

The equation (17) indicates that when energy of an electron entering from the nonmagnetic material 17 into the magnetic material falls within the range of $V_\uparrow$ to $V_\downarrow$, only an up-spin component is transmitted from the nonmagnetic film 17 to the magnetic material and a down-spin component is reflected. Accordingly, spin function of the transmitted electron can be represented by the following equation (18) and that of the reflected electron can be represented by the following equation (19), which reveals that the spin components attenuate rapidly in the vicinity of the interface and then disappear.

$$\psi_1 = \cos\frac{\theta}{2}e^{ikx}(1, 0) \quad (18)$$

$$\psi_{ref} = \sin\frac{\theta}{2}e^{ikx}(0, 1) \quad (19)$$

The attenuation length of the spin transverse component is approximately equal to a penetration depth of a wave function (i.e., the evanescent length); that is, several atomic layers at the longest. When attention is focused on conduction electrons distributed on the Fermi surface, the potential barriers $V_{S2}$ and $V_\downarrow$ are related to the areas and shapes of the Fermi surfaces of the magnetic materials of electrons having respective spins.

Figure 6:
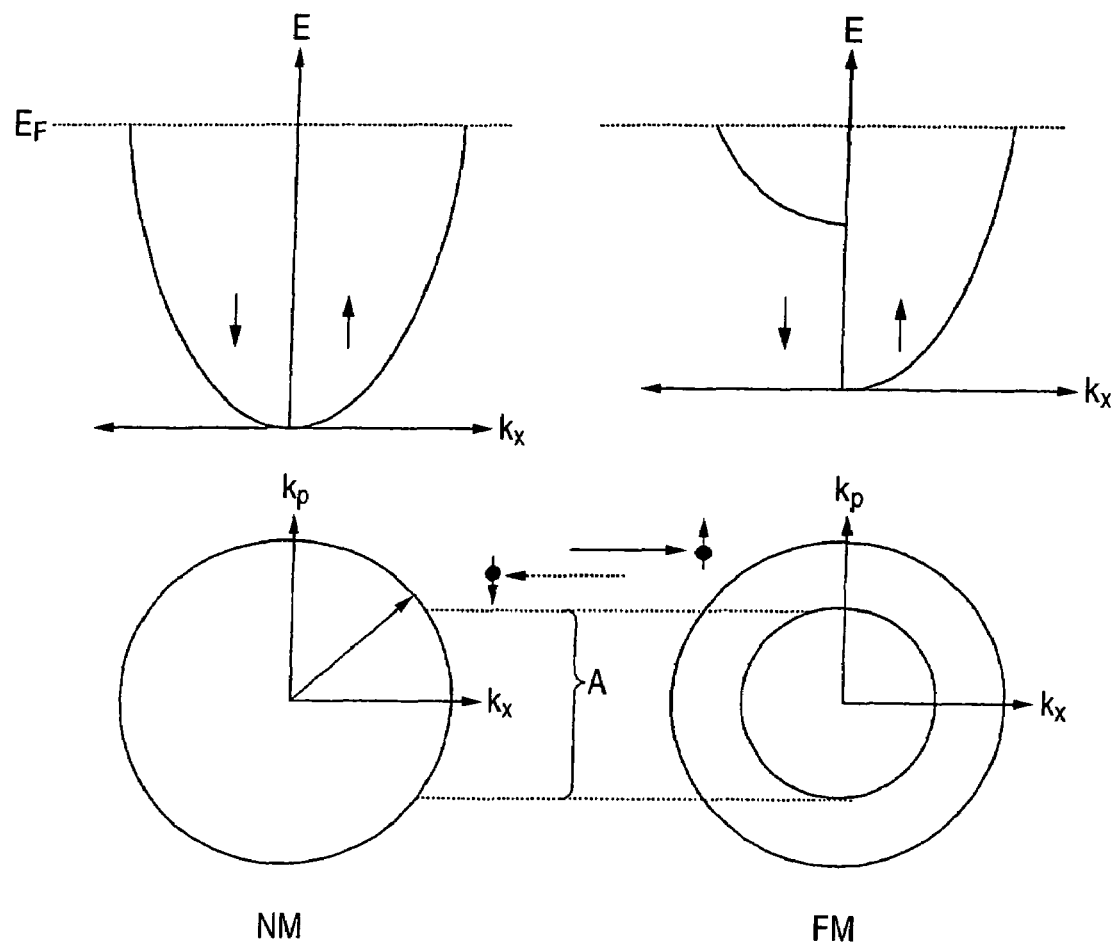
FIG. 6 is a schematic diagram showing an area and a shape of a Fermi surface according to a free electron model.

An area and a shape of a Fermi surface will be described by reference to a free electron model shown in FIG. 6. The left half of FIG. 6 shows a band diagram (upper) and a Fermi surface (lower) of a nonmagnetic material NM. The right half shows those of a magnetic material FM. The left half of each band diagram shows a down-spin band, whereas the right half shows an up-spin band.

Under the assumption that a noble metal such as Cu, Au, or Ag is used as a nonmagnetic material and that Fe (body-centered cubic (bcc)), Co (face-centered cubic (fcc)), or an alloy thereof is used as a magnetic material, the Fermi surface of the nonmagnetic material is approximately the same as that of an up-spin band of the magnetic material, whereas that of an down-spin band is considerably smaller. The right half of the Fermi surface of the nonmagnetic material corresponds to an electron (the up-spin electron indicated with a solid arrow in FIG. 6) having a rightward velocity and directed from the nonmagnetic material to the magnetic material Under the assumption that the momentum which is parallel to the interface between the nonmagnetic material and the magnetic material is maintained, with regard to electrons on the Fermi surface, most up-spin electrons can pass through the magnetic material. In contrast, only down-spin electrons which fall between the two dotted lines A can pass through the magnetic material, and other down-spin electrons will be reflected as shown by a dotted arrow in FIG. 6.

Figure 7:
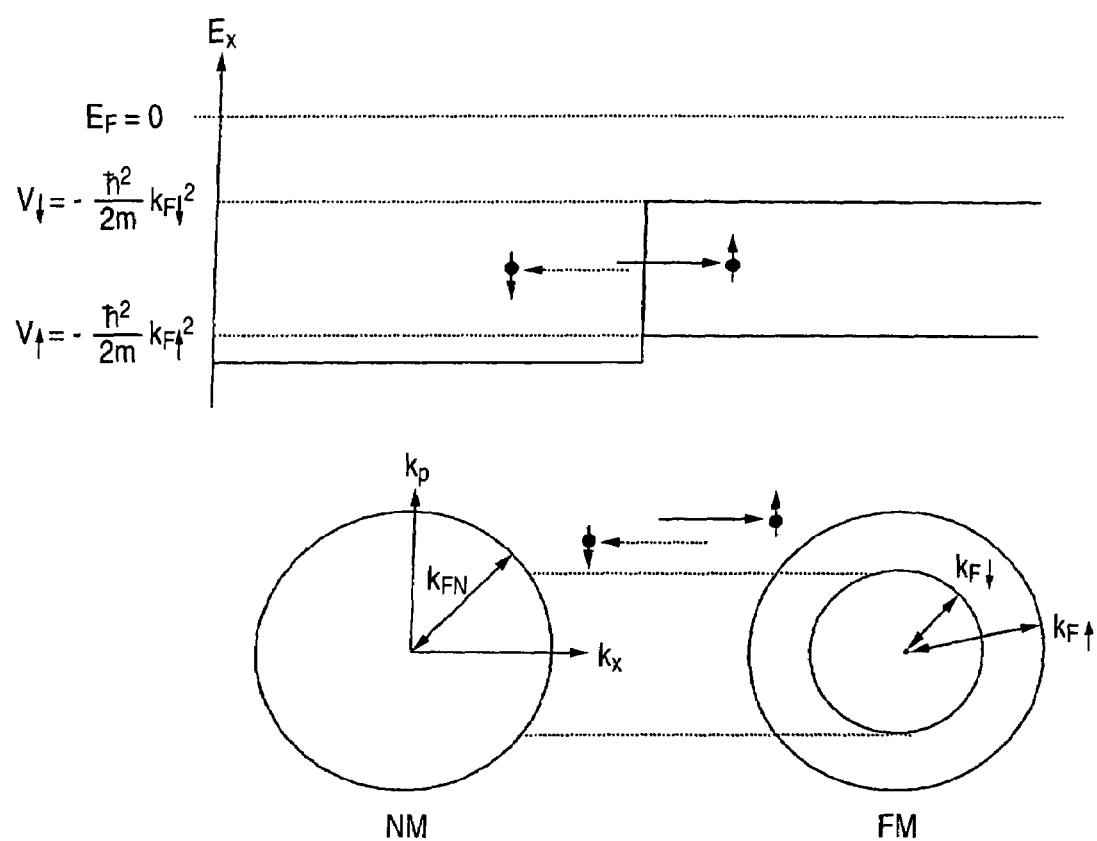
FIG. 7 is a schematic diagram which corresponds to the potential barrier in FIG. 5.

FIG. 7 shows a diagram in which FIG. 6 is modified so as to be related with the potential barrier in FIG. 5. In FIG. 7, $E_X$ shows kinetic energy which is perpendicular to the interface (i.e., the interface between the nonmagnetic/magnetic materials), and a Fermi energy $E_F$ is designated to the origin point of energy zero. Down-spin electrons whose momentum energy in the x-axis direction is $V_\downarrow$ expressed by the following equation (20) or less are reflected at the interface and cannot pass through the magnetic material.

$$V_\downarrow = \frac{\hbar^2}{2m}k_{F\downarrow}^2 \quad (20)$$

Figure 8:
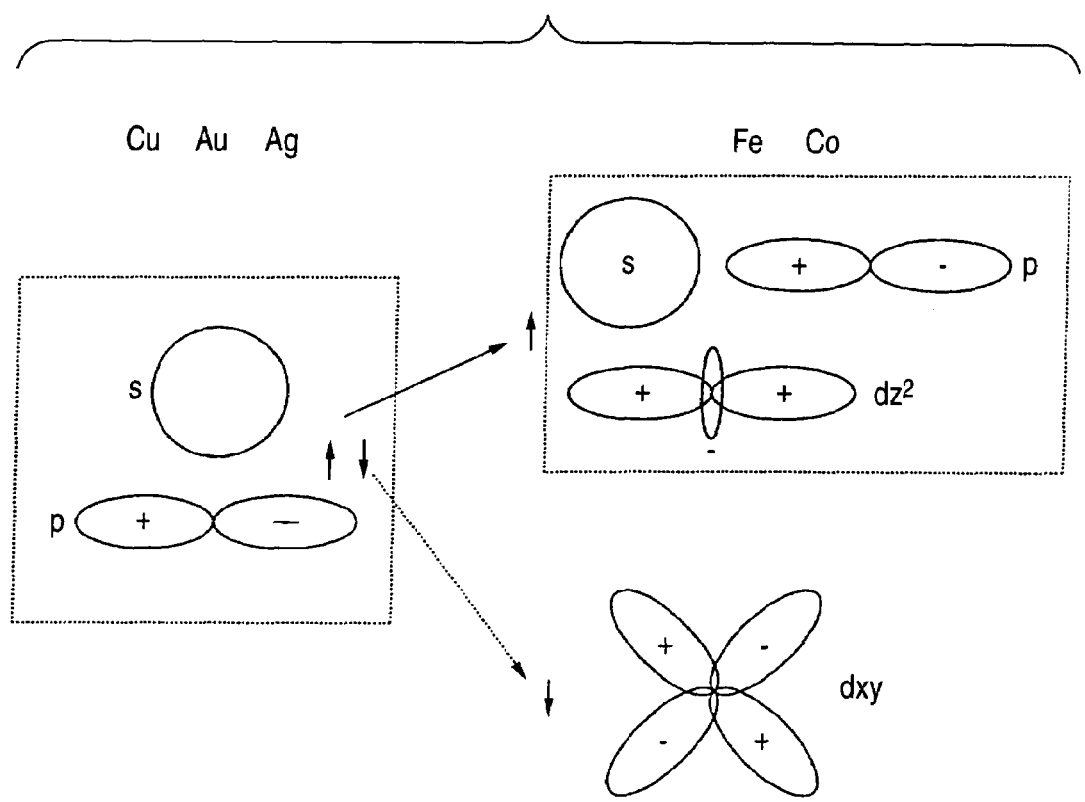
FIG. 8 is a schematic diagram showing Fermi surfaces of noble metals and ferromagnetic materials.

The above free electron model holds comparatively well for a Fermi surface of a noble metal such as Cu, Au, or Ag having a fcc structure, or for that of an up-spin band of a ferromagnetic material such as Fe (bcc) or Co (fcc). In contrast, a shape of a Fermi surface of a down-spin band is deviated from a sphere to a large extent. Therefore, in regard to an actual interface, the spin-dependent transmittance is calculated by first principle calculations. In this case, the transmittance depends not only on the area and shape of the Fermi surface, but also on symmetry of the bands. The symmetry of the bands referred herein means symmetry of orbits constituting the bands. As shown in FIG. 8, the Fermi surface of a noble metal is mainly formed of "s" and "p" orbits. A Fermi surface of an up-spin band of a ferromagnetic material is formed of "s," "p," and "d" orbits, wherein a $dz^2$ orbit is included in the "d" orbit. In contrast, the Fermi surface of a down-spin band is formed of only a "d" orbit of dxy type. Since zero is given as the overlap integral of the "s," "p" orbits and the dxy orbit, the down-spin electrons cannot pass through the noble metal. As a result, there is yielded spin dependence larger than a value estimated from the area or shape of the Fermi surface. The following table shows example calculation results for several interfaces by M. D. Stiles (NIST). In the table 1, the interface resistances are derived from transmittance for comparison with the experimental results, wherein the interface resistances are represented by The following equation (21). The two lines from the bottom in the table show results of CPP-MR experiments; however, most of the experiments were limited to Cu/Co, and the crystal surfaces of the interfaces were not identified.

$$r_{\uparrow(\downarrow)} = 2r_b^*(1-(+)\gamma) \quad (21)$$

|  | $r_\downarrow$ (fΩm²) | $r_\uparrow$ (fΩm²) | γ | $r_b^*$ (fΩm²) |
|---|---|---|---|---|
| Au/Fe (100) | 11.39 | 1.06 | 0.83 | 3.11 |
| Ag/Fe (100) | 12.86 | 1.07 | 0.85 | 3.48 |
| Cr/Fe (100) | 0.77 | 2.87 | −0.58 | 0.91 |
| Cr/Fe (110) | 0.81 | 2.11 | −0.44 | 0.73 |
| Cu/Co (100) | 2.31 | 0.31 | 0.76 | 0.65 |
| Cu/Co (110) | 2.54 | 0.55 | 0.64 | 0.77 |
| Cu/Co (111) | 1.95 | 0.43 | 0.64 | 0.60 |
| Cu/Co exp. |  |  | 0.77 | 0.51 |
| Cu/Co exp. |  |  | 0.85 | 0.3 |

Each interface in the table shows a large value of γ (a ratio of normalized conductivity of up-spin electrons to that of down-spin electrons), which suggests that a transverse component of an injected spin attenuates rapidly in the vicinity of the interface of several atomic layers. The results of the table show that injection of transverse components is quite difficult, requiring effective measures of some type.

In general, a GMR material of fcc or bcc structure yields a large MR ratio. Therefore, an interface transmittance of a GMR material has large spin dependence. Recently, an artificial lattice, wherein Ru layers and Co layers are alternately laminated (hcp) for purpose of reducing a counter magnetization effect (i.e., magnetostatic energy) and increasing the sensitivity of magnetization against the magnetic field, has often been used as a minor GMR element. These materials have a hexagonal crystal structure. For this reason, the shapes of the Fermi surfaces of these materials differ greatly from those of GMR materials which have a cubic crystal structure. Ru layers are generally aligned along the c-axis, and Co layers of hexagonal crystal grow thereon. Consequently, their interface becomes parallel to the c-plane.

Figure 9:
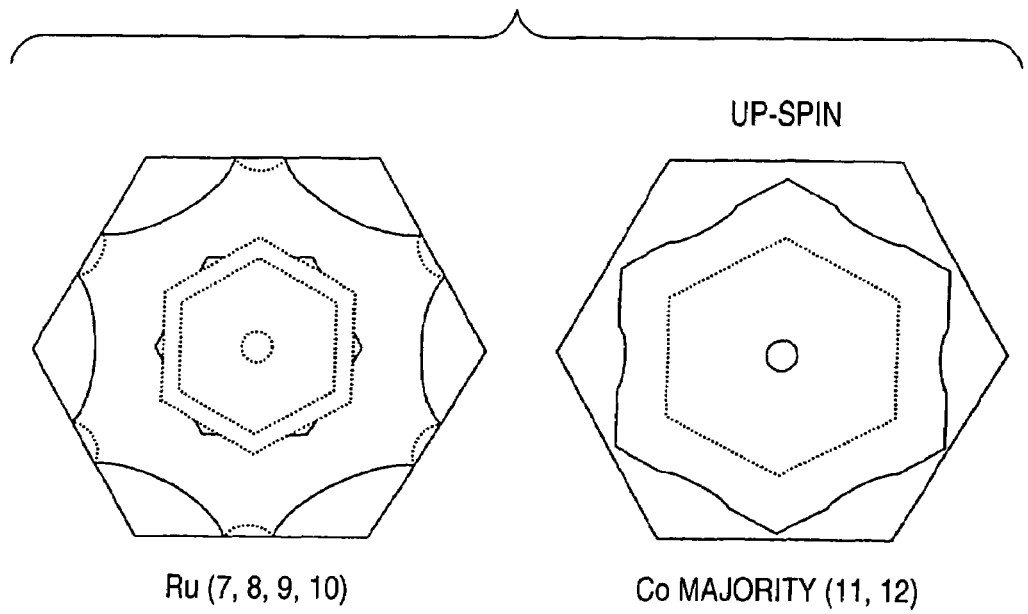
FIG. 9 is a schematic diagram showing Fermi surfaces of up-spins of Ru and Co projected on a c-plane.
Figure 10:
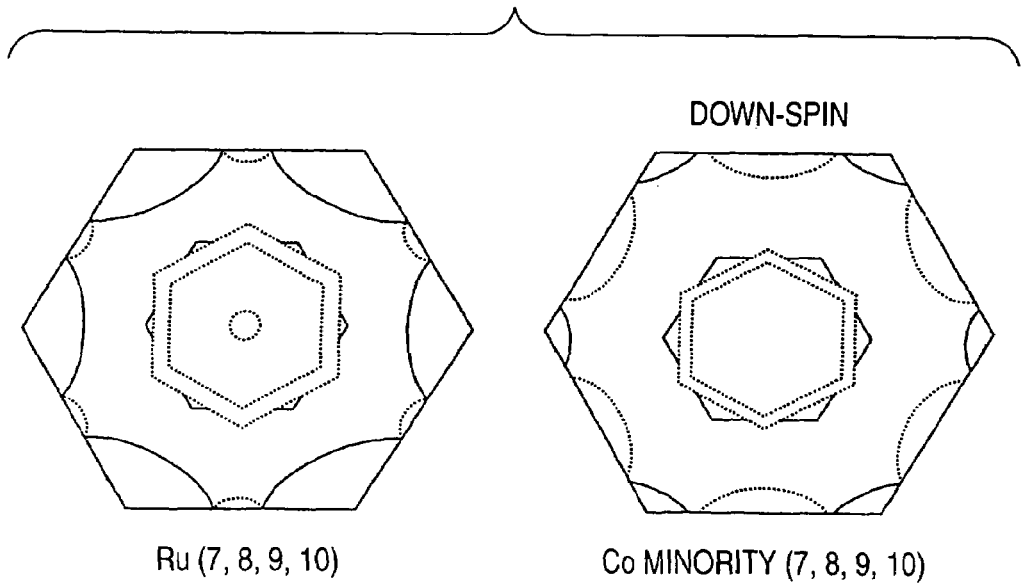
FIG. 10 is a schematic diagram showing Fermi surfaces of down-spins of Ru and Co projected on a c-plane.

FIGS. 9 and 10 show Fermi surfaces wherein up-spins and down-spins of Ru and Co are projected on c-planes. An up-spin band of Co is shown in the right-hand side of FIG. 9, and a down-spin band of Co is shown in the right-hand side of FIG. 10. A plurality of outlines of respective drawings correspond to the bands. Each Fermi surface on which Co is projected has approximately the same area as that of Ru in regard to both spins. The Fermi surface of Co↑ is slightly smaller than that of Ru or Co↓. However, when the magnitude of a Fermi vector (not-shown in the drawing) toward the c-axis is taken into account, the spin dependence of current transmittance is smaller than a simple area ratio.

Unlike the case of a noble metal such as Au, Ag, or Cu, the Fermi surface of Ru, a 4d transition metal, is mainly composed of a "d" orbit. Therefore, the spin dependency of transmittance, which relies on symmetry of the Fermi surface, is small. First-principle calculations on an Ru/Co (hcp) interface have not yet been reported. However, in a recently-reported CPP-MR measurement on an Ru/Co artificial lattice film, quite small values have been reported, as follows: MR ratio=−0.2%; and asymmetry parameter γ=−0.2.

From the reasons described above, employment of an artificial ferromagnetic material including a hexagonal crystal Ru/Co is assumed to enable highly effective introduction of spin fluctuation (a transverse component). Among other existing materials, the following are expected to have a small spin dependence: a material including a hexagonal crystal transition metal (5d) as a nonmagnetic layer like Ru/Co (hcp); e.g., Re/Co (hcp) or Os/Co (hcp); and a material including a cubic crystal transition metal (4d) as a nonmagnetic layer; e.g., Rh/Co (fcc), or Pd/Co (fcc), or an (111) interface of Pd/Ni or the like.

However, Cr/Fe (bcc), which includes a 3d transition metal as a nonmagnetic layer, has a large spin dependence. That is, a (0001) interface of a hexagonal crystal Ru/Co, Re/Co, or Os/Co, or a (111) interface of a cubic crystal Rh/Co, Pd/Co, or Pd/Ni has a high injection efficiency. As a result, from the viewpoint of element characteristics, the most preferred arrangement is to constitute an artificial antimagnetic material from Co or Ni serving as a ferromagnetic material and Ru, Re, Os, Rh, or Pd serving as a nonmagnetic material. Further, a spin transport layer is preferably constituted from one of these nonmagnetic materials or an alloy thereof, or by laminating one of the nonmagnetic materials and another nonmagnetic material.

EXAMPLE 1

Example 1 of the invention will be described below by reference to FIG. 11, which shows a sectional schematic diagram.

<Evaluation of Thermal Fluctuation of Ferromagnetic Material>

In the present embodiment, thermal fluctuation of magnetization of a ferromagnetic material was measured first.

First, the following films were stacked on a silicon substrate 31 by means of sputtering operation and electron beam lithography. The multilayer film has a nonmagnetic Cu layer 33, a ferromagnetic Co layer 35, a nonmagnetic Cu layer 37, a ferromagnetic Fe layer 39, a nonmagnetic Cu layer 41, a nonmagnetic Au layer 43, and a nonmagnetic Cu layer 45 deposited on the substrate 31, in the order given.

Thicknesses of the respective layers are set as follows: namely, the Cu layer 33 assumes a thickness of about 100 nm; the Co layer 35 assumes a thickness of about 50 nm; the Cu layer 37 assumes a thickness of about 30 nm; the Fe layer assumes a thickness of about 1 nm; the Cu layer 41 assumes a thickness of about 10 nm; the Au layer assumes a thickness of about 100 nm; and the Cu layer 45 assumes a thickness of about 100 nm. The junction areas between the ferromagnetic Co layer 35, the nonmagnetic Cu layers 33, 37, and 41, and the Fe layer 39 were each set to approximately 100×100 nm$^2$.

The Co layer 35 and the Fe layer 39 were given magnetic single-axis anisotropy by application of a magnetic field of approximately 1,000 Oe in plane to the film during deposition.

The element resistance "R" of the multilayer film was 5.2Ω, and MR ratio (i.e., ΔR/R) was approximately 0.8%. An external magnetic field was applied in the direction of easy magnetization in plane, and a noise spectrum with an element current of 1 mA was measured. The results are shown in FIG. 6.

Figure 12:
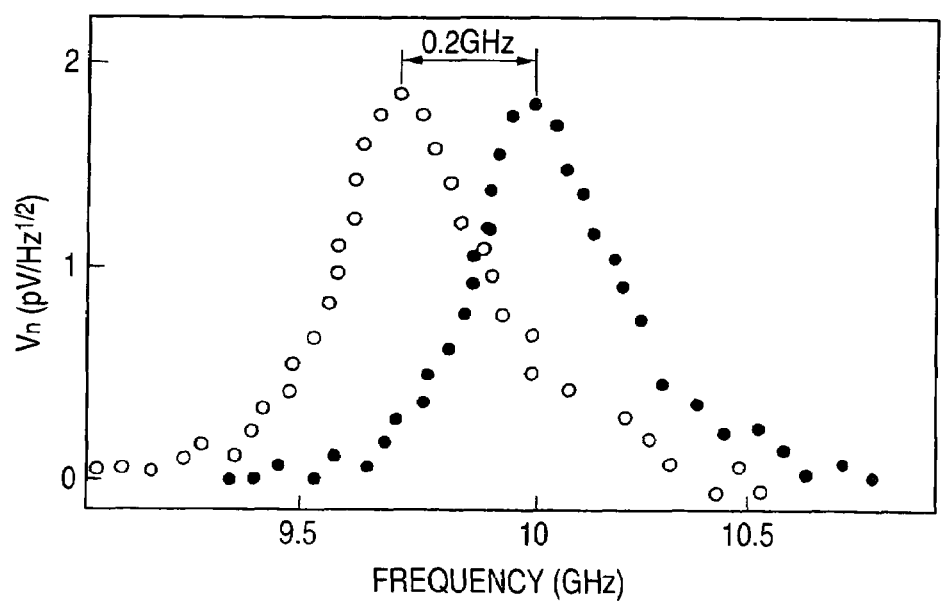
FIG. 12 is a graph showing a noise spectrum obtained in Example 1.

In FIG. 12, the horizontal axis indicates the frequency "f" (GHz) of the applied magnetic field, and the y axis indicates the noise voltage (pico Volt/(Hz)$^{1/2}$) per bandwidth. In FIG. 12, white circles indicate a spectrum obtained in the case where an external magnetic field of 410 Oe was applied, and black circles indicate a spectrum obtained in the case where an external magnetic field of 470 Oe was applied. FIG. 12 shows that when the external magnetic field changes by 60 Oe, the spectrum peak of the noise voltage shifts by approximately 0.2 GHz. Gilbert damping constant α of the Fe layer 39 is approximately 0.02, as estimated from the width of the spectrum peak.

The following equation (22) expresses a relationship between noise voltage $V_n$ and magnetization fluctuation $<m_t^2>$.

$$\left[\int V_n^2(f)df\right]^{\frac{1}{2}} = I\Delta R\sqrt{<m_t^2>} \tag{22}$$

From the result of FIG. 12, an estimation represented by The following equation (23) can be obtained. That is, $\sqrt{<m_t^2>}$ is estimated to be 0.017 radian (1.02°).

$$\sqrt{<m_t^2>}=0.017 \text{radian}=1.02° \tag{23}$$

Since the magnetic fluctuation of the 50 nm thick Co layer is negligible as compared with the magnetization fluctuation of the 1 nm thick Fe layer 39, the magnetization fluctuation of the equation (18) can be assumed to be equal to that of the Fe layer 39.

<Fabrication and Evaluation of Artificial Antiferromagnetic Material>

An artificial antiferromagnetic material was fabricated on a Si substrate by sputtering under a magnetic field of approximately 1,000 Oe. This artificial antiferromagnetic material was made by alternately laminating 10 Fe layers and 10 Cr layers, wherein the Fe layers had a thickness of approximately 1 nm, and the Cr layers had a thickness of approximately 0.7 nm. An antiferromagnetic resonance spectrum of (Fe 1 nm/Cr 0.7 nm)$^{10}$ multilayer film was observed by use of an X-band magnetic resonance imaging apparatus.

Figure 13:
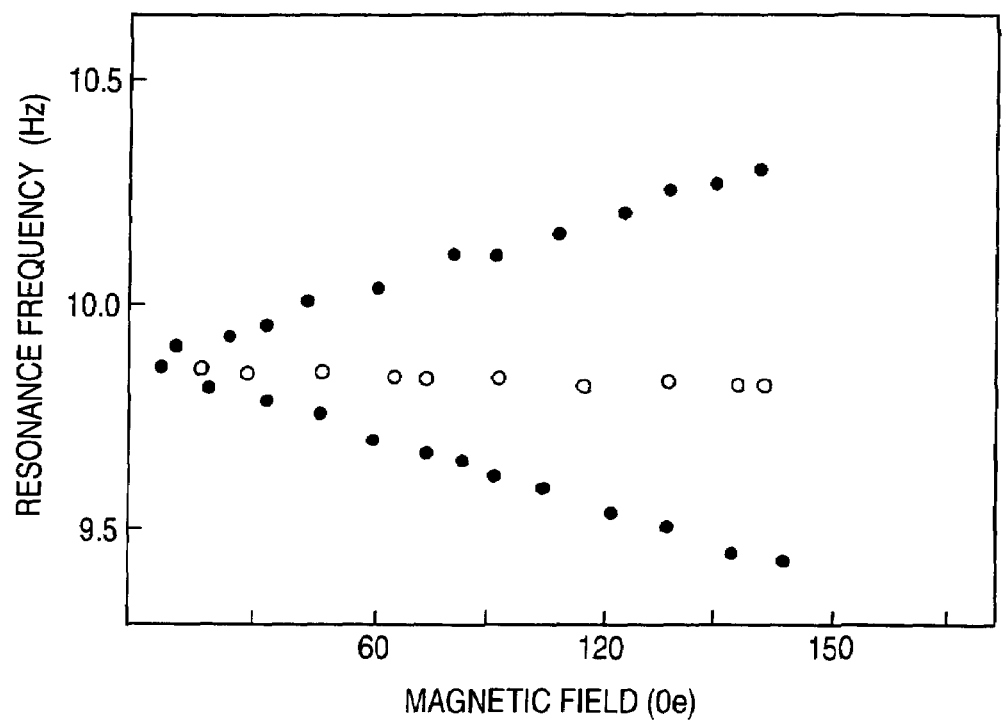
FIG. 13 is graph showing a magnetic field dependence of the resonance frequency of the antiferromagnetic material multilayer film employed in Example 1.

First, a Si substrate, on which an antiferromagnetic film had been deposited, was set in a cavity resonator of variable resonance frequency. A magnetic field was applied to the multilayer film in plane to the multilayer film. Then, the dependence of the resonance frequency on the applied magnetic field was measured. The results are shown in FIG. 13.

Black circles show the result where an external magnetic field was applied in the direction along the magnetization easy axis of the antiferromagnetic multilayer film, and white circles show the result where an external magnetic field was applied perpendicular to the magnetization easy axis. FIG. 13 shows that a resonance frequency was approximately 10 GHz in a zero magnetic field, and a resonance frequency changed little when a magnetic field perpendicular to the magnetization easy axis was applied. The following equation (24) is understood to be derived from a resonance frequency achieved when no external magnetic field exists.

$$\frac{\gamma}{2\pi}\sqrt{H_E H_A} \cong 9.85 \text{ GHz} \tag{24}$$

Here, $H_E$ is the exchange magnetic field and $H_A$ is the anisotropic magnetic field, both of which act between the artificial antiferromagnetic Fe layers. The equation (19) also shows that the resonance frequency changes little when a magnetic field is applied perpendicular to the magnetization easy axis of the artificial antiferromagnetic Fe layers. Meanwhile, the half bandwidth of the resonance line was approximately 0.3 GHz, and Gilbert damping constant obtained therefrom was approximately 0.015.

Figure 11:
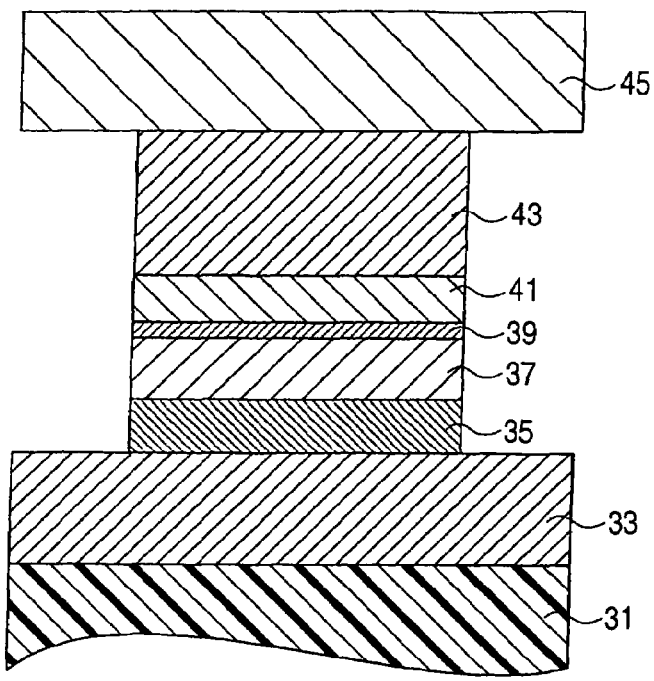
FIG. 11 is a sectional schematic diagram showing a multilayer film according to Example 1 of the invention.

An element was prepared by replacing the 50 nm thick Co layers 35 of the element in FIG. 11 with the artificial antimagnetic film (Fe 1 nm/Cr 0.7 nm)$^{10}$ described previously. At the time of formation of the artificial antiferromagnetic film, sputtering was performed in parallel to the surface of the film within a magnetic field of about 1000Oe. Here, the direction in which the external magnetic field is to be applied when the multilayer film is formed within the magnetic field by means of sputtering was made parallel to the surfaces of the respective layers and perpendicular to the direction of the magnetic field developing when the Fe layer of the ferromagnetic material was formed to 1 nm. In short, the easy axes of the artificial antiferromagnetic multilayer film and that of the ferromagnetic material were perpendicular to each other. Then, the element was fabricated into a junction size of approximately 100 nm×100 nm by electron beam lithography and Ar ion milling, whereon a SiO$_2$ layer serving as an inter-layer insulation film and a Cu layer serving as an upper electrode were deposited.

Figure 14:
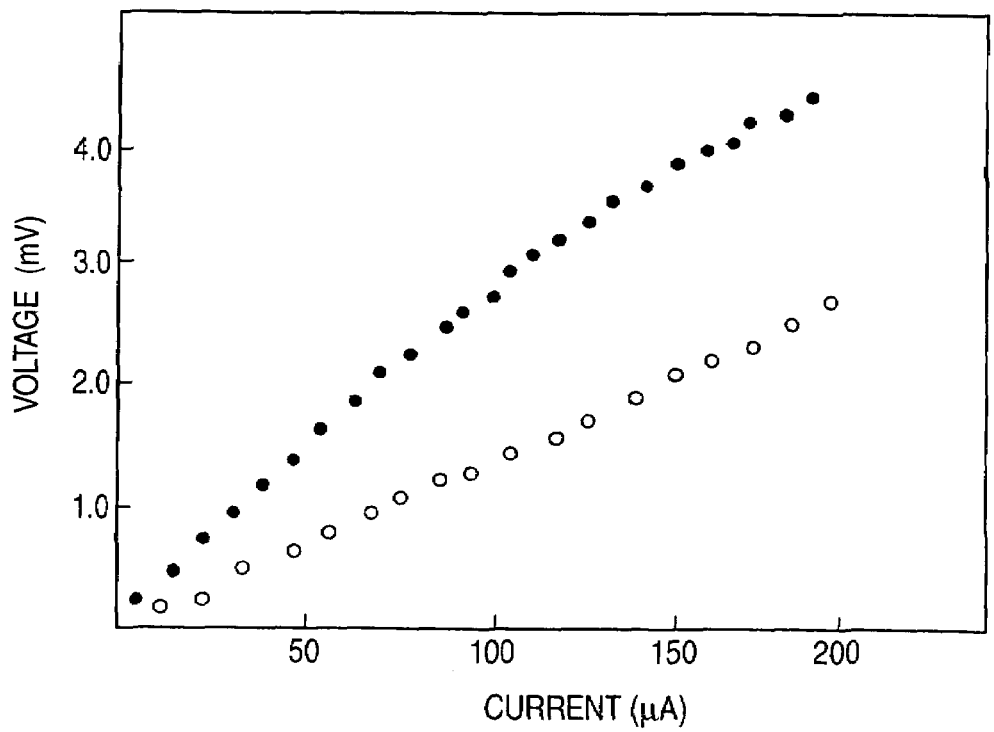
FIG. 14 is a graph showing that current-voltage characteristics of the element of Example 1 depend on the external magnetic field.

An external magnetic field was applied in the direction of the magnetization easy axis of the Fe layer 39, and a current-voltage characteristic of the element was measured. The results are shown in FIG. 14. Black circles show the characteristics under an external magnetic field of 450 Oe, and white circles show those under an external magnetic field of 400 Oe. The results show that antiferromagnetic resonance was induced under an external magnetic field of 450 Oe, and the element resistance therein increased as compared with the case under an external magnetic field of 400 Oe.

FIG. 14 shows that the rate of change in resistance was approximately 100% within the range of 100 μA or less, and decreased to 80% at 200 μA. This result reveals the non-linearity of the resonance intensity.

EXAMPLE 2

Example 2 examined (Co 0.5 nm/Ru 1.5 nm)$^{10}$ multilayer film in lieu of the artificial antiferromagnetic film of Example 1. In the (Co 0.5 nm/Ru 1.5 nm) multilayer film, magnetization of the Co layers is anti-ferromagnetically coupled to the film surface in the perpendicular direction. As in the case of Example 1, a Si substrate having an antiferromagnetic film deposited thereon was set in a cavity resonator in which a resonance frequency is variable. A magnetic field was applied to the multilayer film in plane to the multilayer film. Then, the dependence of the resonance frequency on the applied magnetic field was measured. The following results were obtained: the resonance frequency of the artificial antiferromagnetic, approximately 10 GHz in a zero magnetic field, changed little even when a magnetic field was applied in plane to the film surface.

An element was prepared by replacing the artificial antimagnetic film with the (Co approximately 0.5 nm/Ru approximately 1.5 nm)$^{10}$ multilayer film. In case of sputtering ferromagnetic material Fe, a magnetic field of 1,000 Oe was applied in plane to the substrate for deposition. A magnetic heat treatment (annealing) was not applied on the multilayer film. As in the case of Example 1, the element was formed into a junction size of approximately 50×50 nm$^2$, an external magnetic field was applied in the direction of the magnetization easy axis of the ferromagnetic material Fe, and a current-voltage characteristic of the element was measured. The results show that antiferromagnetic resonance was induced under an external magnetic field of approximately 530 Oe, whereby the element resistance became approximately 48Ω. In other words, the resistance in the ferromagnetic resonance increased by approximately 100% in relation to the element resistance of approximately 25Ω obtained under an external magnetic field of approximately 400 Oe.

Figure 15:
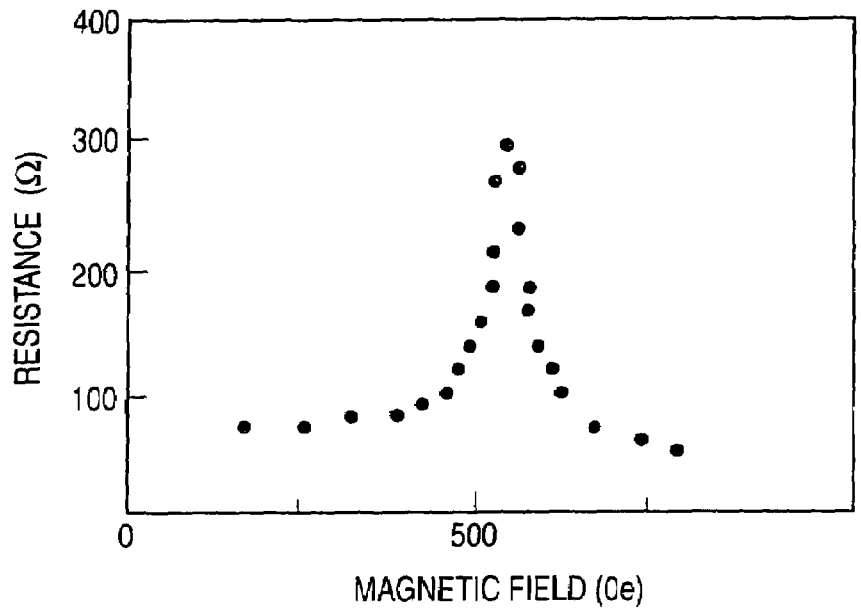
FIG. 15 is a graph showing that a magnetic element according to Example 2 of the invention depends on the resistance of the external magnetic field.
Figure 16:
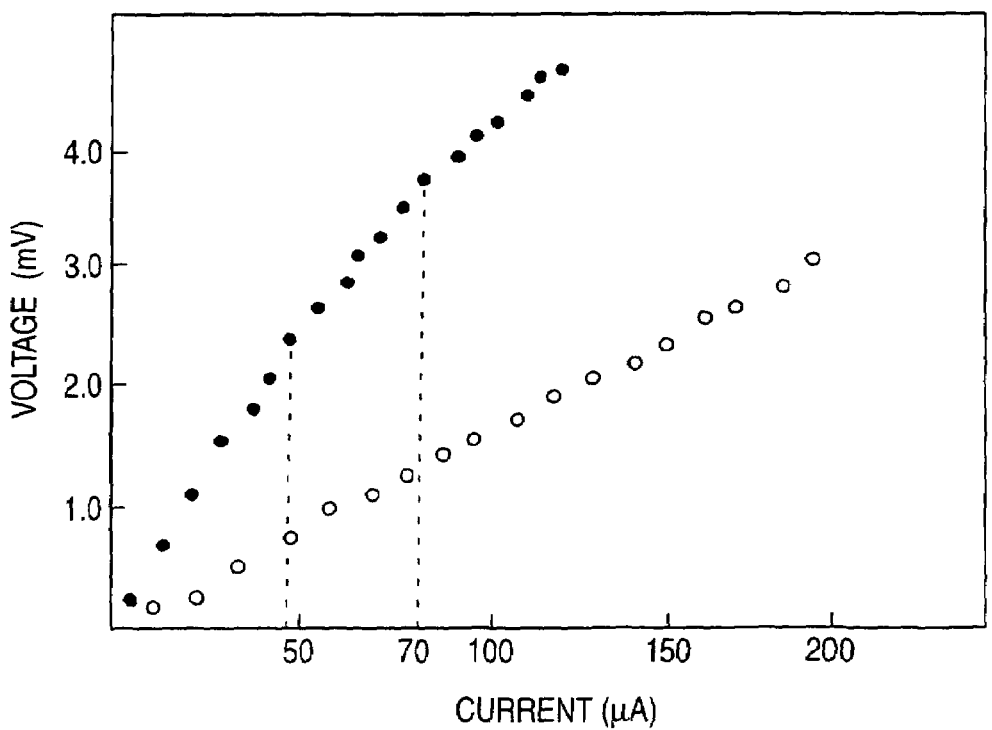
FIG. 16 is a graph showing that current-voltage characteristics of a magnetic element in Example 3 depend on the external magnetic field.

A magnetic element having the same multilayer film structure as above was prepared to have an area of 30×30 nm$^2$, and measurement was performed in the same way as above. The results are shown in FIG. 15, as a magnetic field (Oe) versus resistance (Ω) characteristic. The results confirm the following: when no magnetic field was applied, the element resistance was 75Ω; whereas when an external magnetic field of approximately 530 Oe was applied in the direction along the magnetization easy axis of the ferromagnetic material Fe, the element resistance increased to approximately 300Ω; in other words, a change in resistance of approximately 300% was obtained.

EXAMPLE 3

In Example 3, an element was prepared by providing a barrier layer 29 on an element of Example 1. An oxide material layer was used as the barrier layer.

First, the bottommost Cu layer 33 (approximately 100 nm) was deposited by the same method as employed in Example 1. Pure oxygen of 10$^{-5}$ torr was then introduced into a chamber for approximately one minute in order to oxidize the surface of the Cu layer, to thereby deposit a barrier layer 29 of approximately 4Ω at the interface between the Cu layer and the artificial antiferromagnetic film. Further, by reducing the number of layers of the artificial antiferromagnetic film to five layers, an element similar to that of the first embodiment was prepared. The current-voltage characteristics of the element are shown in FIG. 10. Black circles in FIG. 10 show the characteristics under an external magnetic field of 450 Oe, and white circles show those under an external magnetic field of 400 Oe. The rate of change in resistance increased as compared with the element of Example 1, reaching approximately 200% or more at 50 μA. However, a slight decrease in resonance resistance was observed at approximately 70 μA or higher.

EXAMPLE 4

A magnetic sensor was formed in the same manner as in Example 3 by using Re (hexagonal close-packed structure (0001) alignment, 30 nm) for a nonmagnetic layer for use in spin transfer, and (Co 1 nm/Re 0.5 nm, hexagonal closed-packed structure (0001) alignment)[10] multilayer film for the artificial antiferromagnetic film 15. Magnetization measurement has confirmed that a magnetization easy axis of Co layers of the multilayer film is perpendicular to the plane of the film. The resonance frequency achieve when an external magnetic field was applied in-plane showed no substantial dependence on the magnetic field to yield 9.6 GHz, and Gilbert damping constant was 0.2. As is the case with the third embodiment, an external magnetic field was applied in the direction of easy magnetization of a micro ferromagnetic material, then, the current-voltage of the element was measured. An antiferromagnetic resonance was induced under an external magnetic field of approximately 470 Oe. A change in resistance of 140% was observed under an electric current of 100 μA, and that of 110% was observed under an electric current of 200 μA.

COMPARATIVE EXAMPLE

An element was formed from a 1 nm thick Fe layer in place of the artificial antiferromagnetic film in Example 3. Here, the easy axis of this Fe layer and that of the Fe layer used as the ferromagnetic material were perpendicular to each other. In this element, when an external magnetic field was changed from 450 Oe to 400 Oe, the change in magnetic reluctance was as small as approximately 8%. However, an effective reduction in resonance resistance was not observed even within the range where current was 1 mA or less.

The magnetic element described above in detail can be used as a magnetic sensor. The magnetic element can also be used as a reproducing element for the use in a magnetic information reproducing head mounted on a hard disk drive or the like. The reproducing magnetic head and the magnetic information reproducing apparatus such as a hard disk apparatus having the reproducing magnetic head mounted thereon can be applied for ultra-high-density recording in which recording density ranges from several hundred Gbpsi to 1 Tbpsi or higher.

Heretofore, several embodiments and examples of the invention have been described; however, the invention is not limited thereto, and can be modified in various ways within the scope of the invention as set forth in the appended claims.

Moreover, when being practiced, the invention can be modified in various manners without departing from the scope of the invention.

For example, some elements may be omitted from the elements described in embodiments. Moreover, elements used in different embodiments may be combined appropriately.

What is claimed is:

1. A magnetic element comprising:
a first magnetic material exhibiting thermal fluctuation of magnetization which depends on an external magnetic field and which generates spin fluctuation in conduction electrons;
a nonmagnetic conductive material which is laminated on the first magnetic material and transfers the conduction electrons having the spin fluctuation generated in the first magnetic material;
a second magnetic material which is laminated on the nonmagnetic conductive material and generates magnetic resonance upon injection of the conduction electrons which have the spin fluctuation generated in the first magnetic material and are transferred through the nonmagnetic conductive material, so that the intensity of the magnetic resonance changes in response to changes in the thermal fluctuation of magnetization in the first magnetic material;
a first electrode electrically coupled with the first magnetic material;
a second electrode electrically coupled with the second magnetic material; and
a barrier layer involving a dielectic material is provided in at least one of the following locations: between the first magnetic material and the nonmagnetic conductive material; between the nonmagnetic conductive material and the second magnetic material; and between the second magnetic material and the second electrode.

2. The magnetic element according to claim 1, wherein a magnetization easy axis of the second magnetic material is perpendicular to a magnetization easy axis of the first magnetic material, and the magnetization easy axis of the second magnetic material is perpendicular to a direction of a magnetic field of a magnetic recording medium.

3. The magnetic element according to claim 1, wherein a resonance frequency of magnetic resonance absorption of the second magnetic material is close to a resonance frequency of the first magnetic material.

4. The magnetic element according to claim 1, wherein the first magnetic material comprises Fe, Co, Ni, a Fe alloy, a Co alloy, or a Ni alloy.

5. The magnetic element according to claim 1, wherein the second magnetic material comprises a plurality of ferromagnetic layers, and a nonmagnetic layer sandwiched between the plurality of the ferromagnetic layers, wherein the ferromagnetic material layers adjacent to each other with the nonmagnetic layer therebetween are antiferromagnetically coupled to each other.

6. The magnetic element according to claim 4, wherein the ferromagnetic layers comprise Fe, Co, Ni, an Fe alloy, a Co alloy or an Ni alloy.

7. The magnetic element according to claim 4, wherein the nonmagnetic material layer comprises any of Pt, Au, Ag, Cu, Cr, Ru, Rh, Mo, W, Pd, Re, or Os.

8. The magnetic element according to claim 1, wherein the first and second magnetic materials are $A_x Mn_{1-x}$, wherein "A" includes at least one of Fe, Co, Ni, Ir, Pr, Rh, Cu, Cr, Pt, Pd, Al, and Ti, and "x" is defined as $0 \leq x \leq 1$, or $B_y C_{1-y}$, wherein "B" includes at least one of Fe and Ni, "C" includes at least one of V, Cr, and Cu,; "y" is defined as $0 \leq y \leq 1$.

9. The magnetic element according to claim 1, wherein the first magnetic material, the nonmagnetic conductive material, and the second magnetic material have a crystal structure of a (0001) alignment layer of hexagonal close-packed structure, or a (111) alignment layer of cubic close-packed structure.

10. A magnetic information reproducing head using a magnetic material comprising:
- a first magnetic material exhibiting thermal fluctuation of magnetization which depends on an external magnetic field and which generates spin fluctuation in conduction electrons;
- a nonmagnetic conductive material which is laminated on the first magnetic material and transfers the conduction electrons having the spin fluctuation generated in the first magnetic material;
- a second magnetic material which is laminated on the nonmagnetic conductive material and which generates magnetic resonance upon injection of the conduction electrons which have the spin fluctuation generated in the first magnetic material and are transferred through the nonmagnetic conductive material, so that the intensity of the magnetic resonance changes in response to changes in the thermal fluctuation of magnetization;
- a first electrode electrically coupled with the first magnetic material;
- a second electrode electrically coupled with the second magnetic material; and
- a barrier layer involving a dielectic material is provided in at least one of the following locations: between the first magnetic material and the nonmagnetic conductive material; between the nonmagnetic conductive material and the second magnetic material; and between the second magnetic material and the second electrode.

11. A magnetic information reproducing apparatus mounting thereon a magnetic information reproducing head which uses a magnetic material comprising:
- a first magnetic material exhibiting thermal fluctuation of magnetization which depends on an external magnetic field and which generates spin fluctuation in conduction electrons;
- a nonmagnetic conductive material which is laminated on the first magnetic material and transfers the conduction electrons having the spin fluctuation generated in the first magnetic material;
- a second magnetic material which is laminated on the nonmagnetic conductive material and generates magnetic resonance upon injection of the conduction electrons which have the spin fluctuation generated in the first magnetic material and are transferred through the nonmagnetic conductive material, so that the intensity of the magnetic resonance changes in response to changes in the thermal fluctuation of magnetization;
- a first electrode electrically coupled with the first magnetic material;
- a second electrode electrically coupled with the second magnetic material; and
- a barrier layer involving a dielectic material is provided in at least one of the following locations: between the first magnetic material and the nonmagnetic conductive material; between the nonmagnetic conductive material and the second magnetic material; and between the second magnetic material and the second electrode.

12. The magnetic element according to claim 10, wherein a magnetization easy axis of the second magnetic material is perpendicular to a magnetization easy axis of the first magnetic material, and the magnetization easy axis of the second magnetic material is perpendicular to a direction of a magnetic field of a magnetic recording medium.

13. The magnetic element according to claim 10, wherein the second magnetic material comprises a plurality of ferromagnetic layers, and a nonmagnetic layer sandwiched between the plurality of the ferromagnetic layers, wherein the ferromagnetic material layers adjacent to each other with the nonmagnetic layer therebetween are antiferromagnetically coupled to each other.

14. The magnetic element according to claim 11, wherein a magnetization easy axis of the second magnetic material is perpendicular to a magnetization easy axis of the first magnetic material, and the magnetization easy axis of the second magnetic material is perpendicular to a direction of a magnetic field of a magnetic recording medium.

15. The magnetic element according to claim 11, wherein the second magnetic material comprises a plurality of ferromagnetic layers, and a nonmagnetic layer sandwiched between the plurality of the ferromagnetic layers, wherein the ferromagnetic material layers adjacent to each other with the nonmagnetic layer therebetween are antiferromagnetically coupled to each other.

* * * * *